US012705020B2

(12) United States Patent
Pike

(10) Patent No.: US 12,705,020 B2
(45) Date of Patent: Aug. 11, 2026

(54) PRIMARY-AMBIENT PLAYBACK ON AUDIO PLAYBACK DEVICES

(71) Applicant: Sonos, Inc., Goleta, CA (US)

(72) Inventor: Christopher Pike, Manchester (GB)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 19/109,920

(22) PCT Filed: Sep. 6, 2023

(86) PCT No.: PCT/US2023/073540
§ 371 (c)(1),
(2) Date: Mar. 7, 2025

(87) PCT Pub. No.: WO2024/054837
PCT Pub. Date: Mar. 14, 2024

(65) Prior Publication Data

US 2025/0258641 A1 Aug. 14, 2025

Related U.S. Application Data

(60) Provisional application No. 63/374,857, filed on Sep. 7, 2022.

(51) Int. Cl.
*G06F 3/16* (2006.01)
*H04R 1/02* (2006.01)
*H04R 5/02* (2006.01)

(52) U.S. Cl.
CPC ............... *G06F 3/165* (2013.01); *H04R 1/02* (2013.01); *H04R 5/02* (2013.01)

(58) Field of Classification Search
None
See application file for complete search history.

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

CN 112422721 B 9/2022
EP 1389853 A1 2/2004
(Continued)

OTHER PUBLICATIONS

International Search Report and Written Opinion dated Jan. 12, 2024; International Application No. PCT/US2023/073540; Applicant: Sonos, Inc.; 12 pages.
(Continued)

*Primary Examiner* — Duc Nguyen
*Assistant Examiner* — Assad Mohammed
(74) *Attorney, Agent, or Firm* — Fortem IP LLP

(57) ABSTRACT

Example techniques relate to primary-ambient playback of surround audio by audio playback devices. Example playback devices described herein may include multiple speakers, such as a forward-firing audio transducer and side-firing audio transducers. Using example techniques, such playback devices may perform primary-ambient decomposition to separate surround channels into primary' and ambient channels. The playback devices play back the ambient channel(s) via the side-firing transducers and the primary channel via the forward-firing transducer.

20 Claims, 16 Drawing Sheets

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollström et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,967,437 | B1 | 5/2018 | Meyers et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2002/0173273 | A1 | 11/2002 | Spurgat et al. |
| 2003/0157951 | A1 | 8/2003 | Hasty |
| 2004/0024478 | A1 | 2/2004 | Hans et al. |
| 2006/0050907 | A1 * | 3/2006 | Levitsky ................ H04R 1/345 381/304 |
| 2007/0142944 | A1 | 6/2007 | Goldberg et al. |
| 2008/0175394 | A1 * | 7/2008 | Goodwin ................ H04S 3/008 381/1 |
| 2013/0182852 | A1 | 7/2013 | Thompson et al. |
| 2013/0294638 | A1 * | 11/2013 | Huseby .................... H04R 1/02 381/394 |
| 2014/0064527 | A1 | 3/2014 | Walther et al. |
| 2015/0092947 | A1 * | 4/2015 | Gossain ................. H04R 27/00 381/58 |
| 2017/0069330 | A9 | 3/2017 | Adami et al. |
| 2018/0182410 | A1 * | 6/2018 | Kaskari ................... G10L 25/18 |
| 2019/0107867 | A1 * | 4/2019 | Chiang ................. G06F 1/1618 |
| 2020/0213735 | A1 | 7/2020 | Family et al. |
| 2020/0359155 | A1 | 11/2020 | Uhle et al. |
| 2022/0150653 | A1 | 5/2022 | Zheng |
| 2022/0240012 | A1 | 7/2022 | Maclean et al. |
| 2022/0264498 | A1 | 8/2022 | Keyser-Allen et al. |

FOREIGN PATENT DOCUMENTS

| | | | |
|---|---|---|---|
| WO | 0153994 | A2 | 7/2001 |
| WO | 2003093950 | A2 | 11/2003 |
| WO | 2013111034 | A2 | 8/2013 |

OTHER PUBLICATIONS

Herre et al.; MPEG surround-the ISO/MPEG standard for efficient and compatible multichannel audio coding; Journal of the Audio Engineering Society 56.11 (2008): 932-955. Retrieved on Dec. 26, 2023 (Dec. 26, 2023) from <https://citeseerx.ist.psu.edu/document?repid=rep1&type=pdf&doi=62b654ada57c6b2115898d123cb126564c22a115> entire document.

AudioTron Quick Start Guide, Version 1.0, Mar. 2001, 24 pages.

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc Scatternet for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

European Patent Office, European Extended Search Report mailed on Oct. 22, 2025, issued in connection with European Application No. 23863953.8, 33 pages.

International Bureau, International Preliminary Report on Patentability, mailed on Mar. 20, 2025, issued in connection with International Application No. PCT/US2023/073540, filed on Sep. 6, 2023, 10 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

Sonos, Inc. v. D&M Holdings (No. 14-1330-RGA), Di 219, Claim Construction Opinion (Jan. 12, 2017) (24 pages).

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

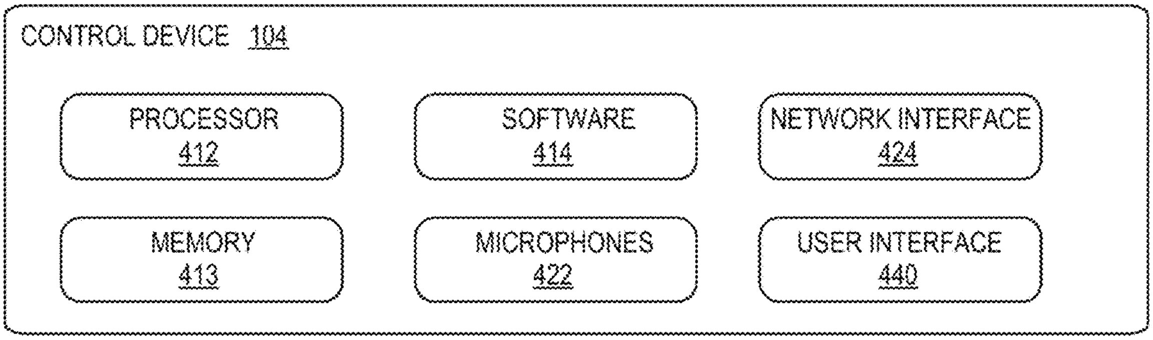

Fig. 4

540a
NOW PLAYING (Office)
Track Title
Artist Name
544
QUEUE
Track 1
Track 2
Track 3
Track 4
546
Music Source 1
Music Source 2
Music Source 3
First VAS
Second VAS
+ ADD Music source
+ ADD VAS source
548
542
Sonos
Browse
Rooms
Search music
541

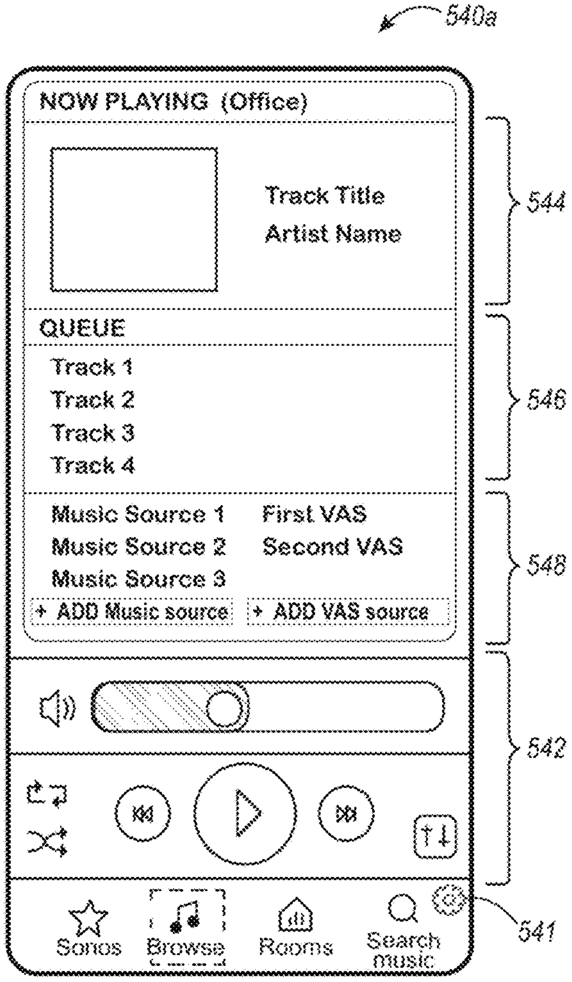

Fig. 5A 540b
543
No Music
Balcony
Group
Audio Component
Living Room
Living Room
Group
No Music
Dining Room
+ Kitchen
Group
No Music
Office
Group
Sonos
Browse
Rooms
Search music

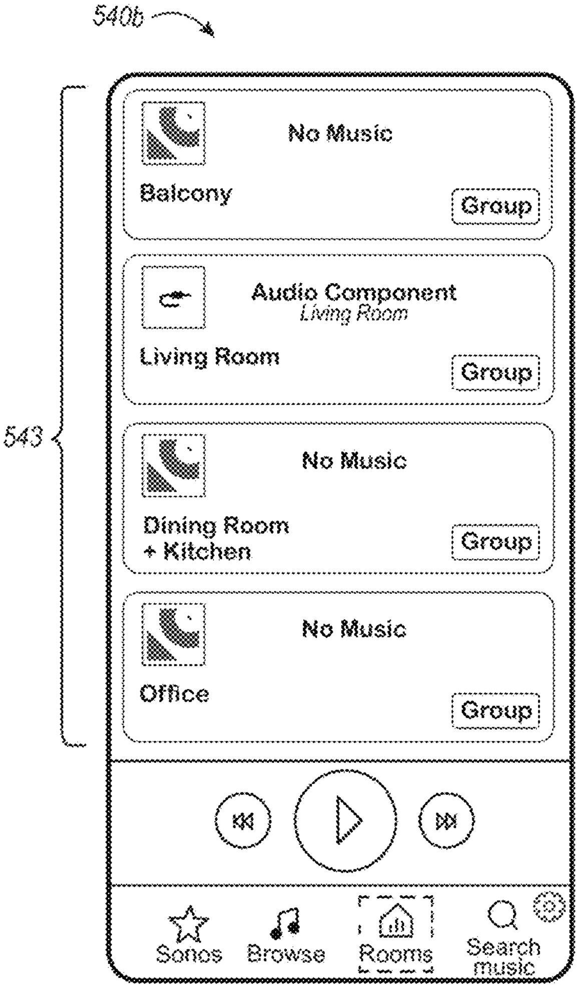

Fig. 5B

PRIMARY-AMBIENT PLAYBACK ON AUDIO PLAYBACK DEVICES

CROSS-REFERENCE TO RELATED APPLICATION

This application is a 371 national phase application of International Patent Application No. PCT/US2023/073540, filed Sep. 6, 2023, which claims the benefit of priority to U.S. Patent Application No. 63/374,857, filed Sep. 7, 2022, each of which is incorporated herein by reference in its entirety.

FIELD OF THE DISCLOSURE

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings where:

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 4 is a functional block diagram of an example controller device in accordance with aspects of the disclosure.

FIGS. 5A and 5B are controller interfaces in accordance with aspects of the disclosure.

Figure 1A:
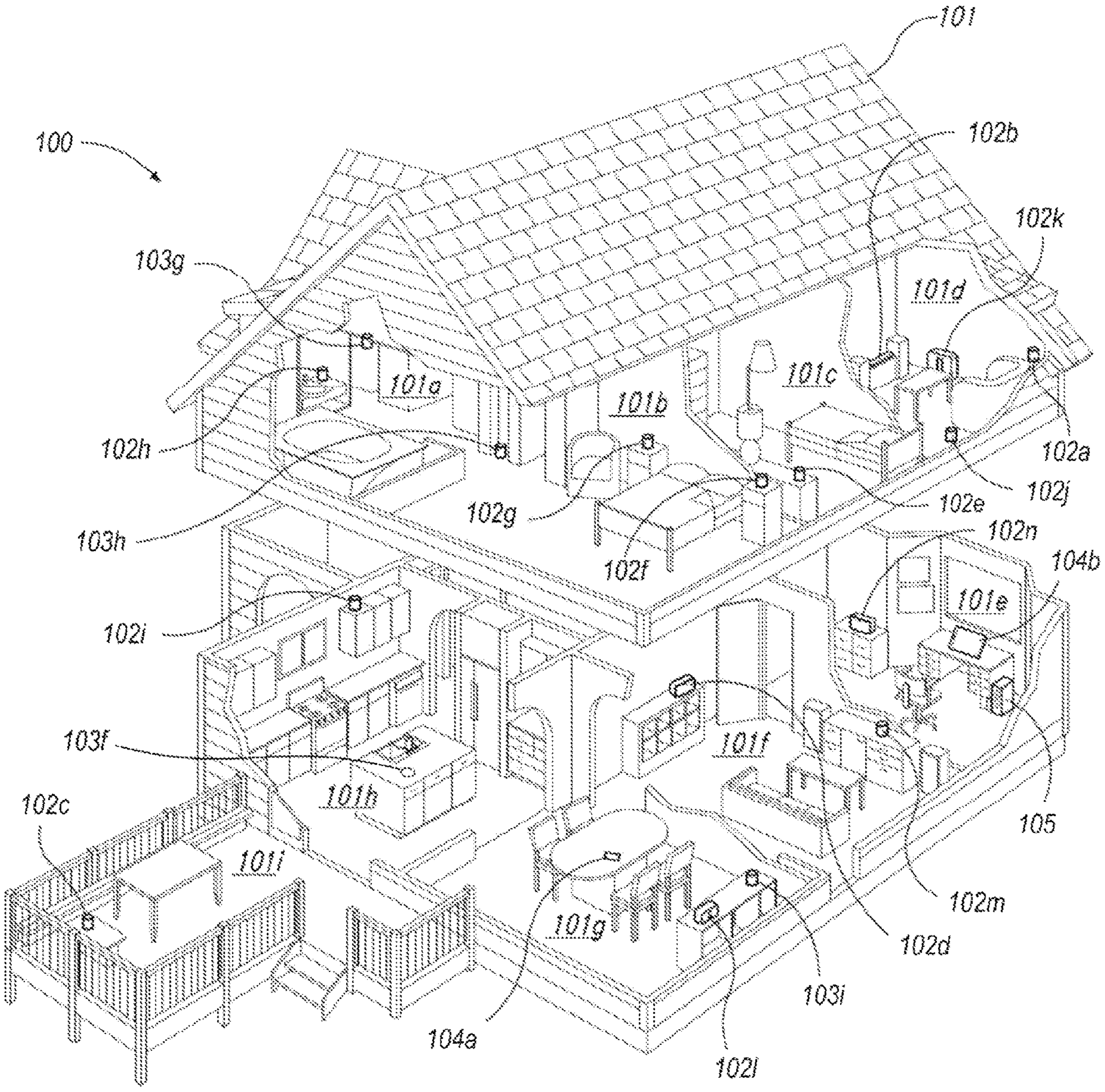
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles, and other features shown in the Figures are merely illustrative of particular embodiments of the disclosed technology. Accordingly, other embodiments can have other details, dimensions, angles, and features without departing from the spirit or scope of the disclosure. In addition, those of ordinary skill in the art will appreciate that further embodiments of the various disclosed technologies can be practiced without several of the details described below.

DETAILED DESCRIPTION

I. Overview

Examples described herein relate to primary-ambient playback of surround audio channels via audio playback devices. In some surround sound audio formats, the content is mixed during production such that the surround audio channels are intended to provide ambience. Yet, this intent may be frustrated when output from playback devices is too localized (i.e., point-like).

Example playback devices may include side-firing left and right audio transducers, which may facilitate playback of ambient audio in surround audio channels. Compared to forward-firing transducers, reproduction of ambient audio using side-firing transducers may be less localized. Since sound is directed away from listeners and reaches a user's ears indirectly, certain users may perceive output of surround channels via side-firing audio transducers as ambient sound more readily as compared with reproduction of ambient audio using forward-firing transducers.

At the same time, some content in the surround audio channels might not be ambient audio. Instead, surround audio channels may include a mix of primary and ambient audio content, especially with object-based mixes such as Dolby® ATMOS®. Playback of primary audio content via side-firing audio transducers may likewise frustrate the intent of such mixes.

Example playback devices may further include a forward-firing transducer, which may be used to play back primary audio content. Primary audio content played via such a transducer may be perceived as coming from the playback device. Assuming the surround playback devices are placed properly relative to the listening position, such playback may further the producer's intent.

In many cases, example surround formats do not natively separate primary and ambient audio content. Instead, such formats include a mix of both primary and ambient audio in the surround channels. Moreover, even if a format included separate channels, sending multiple channels each to multiple playback devices operating as surrounds may create bandwidth issues, especially when transmitting such data wirelessly (e.g., via Wi-Fi®).

Example playback devices may utilize primary-ambient decomposition to separate primary and ambient audio. Then, the side-firing transducers may output the ambient component while the forward-firing transducers output the primary component, which yields a playback device with both ambient and direct surround behavior. Example primary-ambient decomposition techniques include least-squares estimation in the short-time Fourier transform domain as described by Faller, which produces diffuse primary and ambient components of a surround audio signal. Faller, C. (2006). "Multiple-Loudspeaker Playback of Stereo Signals." *Journal of the Audio Engineering Society,* 54 (11), 1051. http://www.aes.org/e-lib/browse.cfm?elib=13886.

As indicated above, example playback devices may include multiple audio transducers, which may be carried by a housing. The audio transducers may include a forward-firing transducer, one or more first side-firing transducers, and one or more second side-firing transducers. The one or more first side-firing transducers and one or more second side-firing transducers may be arranged such that they direct their respective outputs in opposite directions (i.e., 180° from one another). The forward-firing transducer may then be arranged to output orthogonally to the output of the first side-firing transducers and the second side-firing transducers (i.e., 90° from the output of the side-firing transducers). Within examples, the audio transducers are individually drivable via one or more amplifiers of the playback device so as to individually reproduce the audio signals, such as the ambient and primary components of surround audio signals introduced above.

In further examples, the one or more first side-firing transducers and one or more second side-firing transducers may be arranged such that they direct their respective outputs in not quite fully opposite directions. For instance, the side-firing transducers may be arranged in a 'V' pattern. In such an example, the side-firing transducers may direct their output at a lesser angle than 180° from one another, such as at 120° (and 60° from the output for the forward-firing transducer). Other examples are possible as well.

In some cases, a playback device may be positioned with a wall or other obstruction within a minimum threshold distance (e.g., 30 cm) to one or more of the side-firing transducers. In such cases, the obstruction may distort or otherwise effective output from the obstructed transducers. In such examples, the playback devices may self-correct their output to avoid at least some of the effects of the obstruction.

Within examples, when an obstruction is detected, the playback device may use a steering technique to direct the output away from its "natural" output pattern and in a direction that is less affected by the obstruction. For instance, assuming an obstruction to the right side, the playback device may adjust a mix between the side-firing audio transducers and the forward-firing transducer to output at least a portion of the ambient component via the forward-firing transducer. Such an adjustment "steers" the combined output of the transducers away from the right side (and the obstruction). The amount of steering may depend on the size and location of the obstruction relative to the playback device (which impacts the degree of distortion caused). Additionally, or alternatively, the playback device may mute or lower the gain of the right side-firing transducer(s) and may further increase the gain of the left side-firing transducer(s).

The playback device may detect the obstruction using a suitable technique. For instance, the playback device may include one or more microphones, which it may use to capture its own output. By analyzing this captured output for distortions, the playback device may detect the presence of an obstruction in proximity to (e.g., less than 30 cm from) the audio transducer. In further examples, the playback device may include one or more sensors (e.g., an IR LED infrared or ultrasonic sensor) to more directly detect the distance from the playback device to any obstruction(s) that are proximate to the playback device.

As noted above, example techniques relate to primary-ambient playback of surround audio channels via audio playback devices. An example implementation involves system including a first playback device, a second playback device, and a third playback device. The first playback device includes a forward-firing audio transducer and side-firing audio transducers and the second playback device includes an additional forward firing audio transducer and additional side-firing audio transducers. The system is configured to receive multi-channel audio content, the multi-channel audio content comprising a first audio signal representing a first surround channel, a second audio signal representing a second surround channel, and one or more third audio signals; buffer the received multi-channel audio content into one or more buffers; as the received multi-channel audio content is buffered, perform a primary-ambient decomposition on the first audio signal and the second audio signal to generate (i) a first primary signal and a first ambient signal from the first audio signal and (ii) a second primary signal and a second ambient signal from the second audio signal; cause the first playback device to play back the first primary signal via the first forward-firing audio transducer and the first ambient signal via the side-firing audio transducers in synchrony with playback of the one or more third audio signals by the third playback device; and cause the second playback device to play back the second primary signal via the additional forward-firing audio transducer and the second ambient signal via the additional side-firing audio transducers in synchrony with playback of the one or more third audio signals by the third playback device.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operation Environment

Figure 1B:
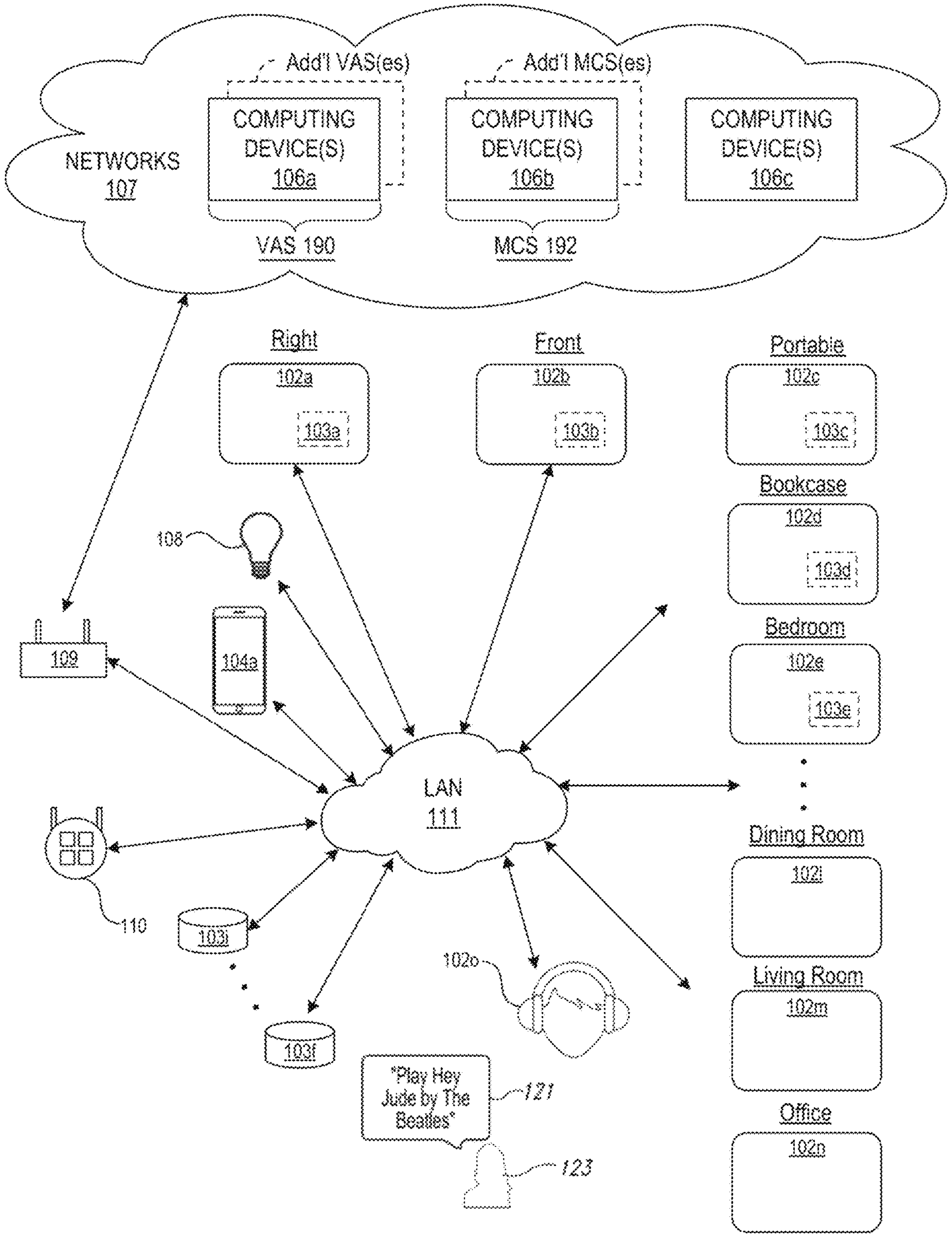
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101*a*, a master bedroom 101*b*, (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102*a*-1020), network microphone devices 103 (identified individually as "NMDs" 103*a*-102*i*), and controller devices 104*a* and 104*b* (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A).

In embodiments described below, one or more of the various playback devices 102 may be configured as portable playback devices, while others may be configured as stationary playback devices. For example, the headphones 1020 (FIG. 1B) are a portable playback device, while the playback device 102*d* on the bookcase may be a stationary device. As another example, the playback device 102*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102, 103, and 104 and/or other network devices of the MPS 100 may be coupled to one another via point-to-point connections and/or over other connections, which may be wired and/or wireless, via a network 111, such as a LAN including a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related embodiment, the Left playback device 102*j* may communicate with other network devices, such as the playback device 102*b*, which may be designated as the "Front" device, via a point-to-point connection and/or other connections via the NETWORK 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106 are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 102 may take the form of or include an on-board (e.g., integrated) network microphone device. For example, the playback devices 102*a-e* include or are otherwise equipped with corresponding NMDs 103*a-e*, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103*f* and 103*g* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 102*l*, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the network 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102*d* in the environment 101 (FIG. 1A) is in relatively close proximity to the NMD-equipped Living Room playback device 102*m*, and both devices 102*d* and 102*m* may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application No.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the NETWORK 111 (FIG. 1B) may be eliminated and the single playback device 102 and/or the single NMD 103 may communicate directly with the remote computing devices 106-*d*. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
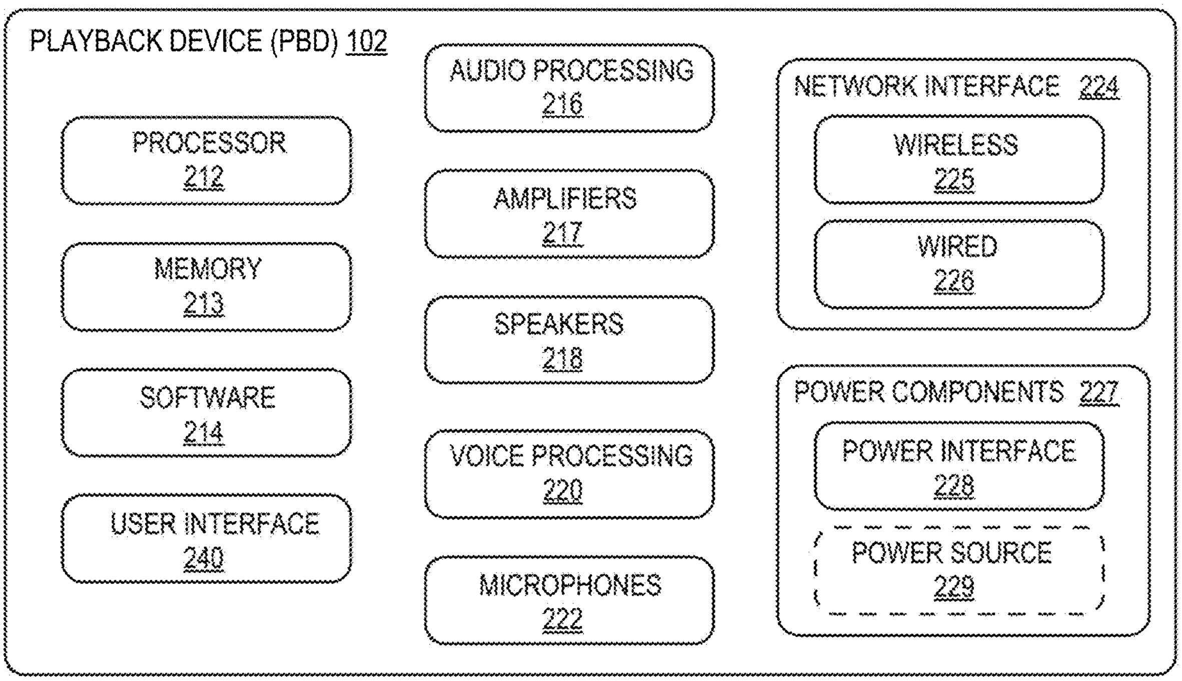
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the play back device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled “System and method for synchronizing operations among a plurality of independently clocked digital data processing devices,” which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters (“DAC”), one or more audio preprocessing components, one or more audio enhancement components, one or more digital signal processors (“DSPS”), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a “driver”) or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11 g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPS or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
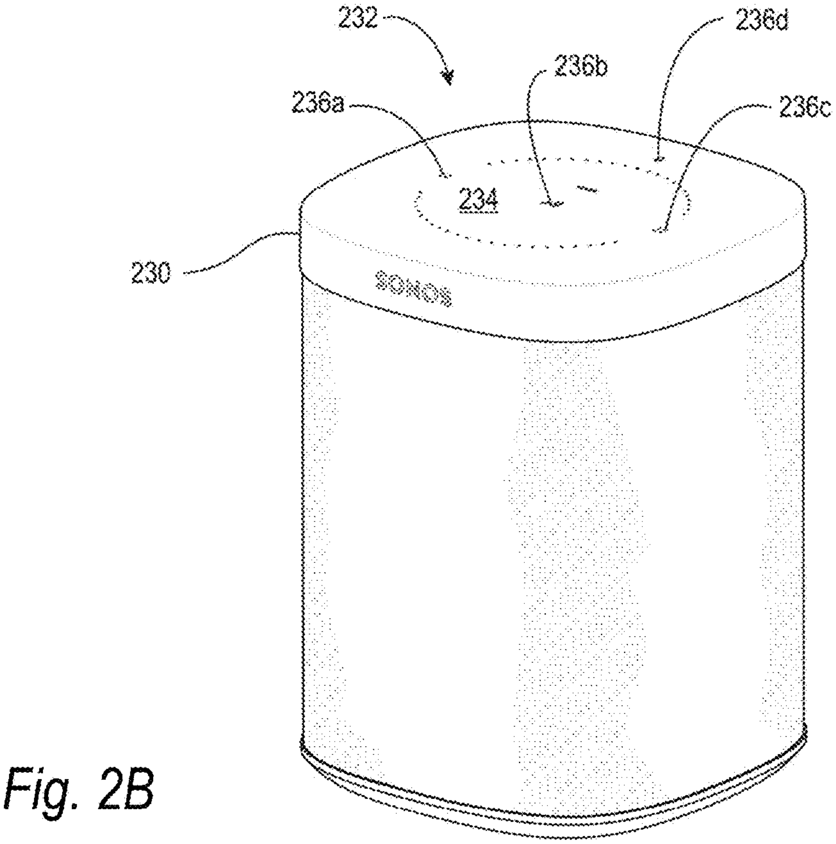
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236*a-c* for controlling audio playback, volume level, and other functions. The control area 232 also includes a button 236*d* for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the MPS 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

Figure 2C:
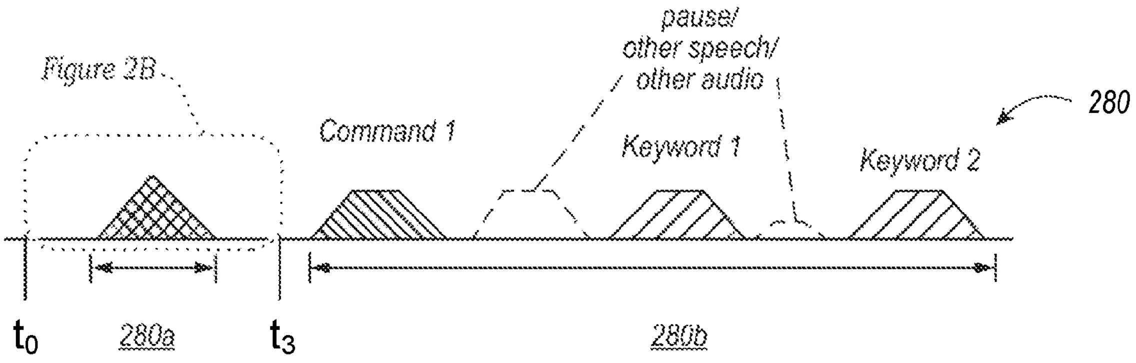
FIG. 2C is a diagram of an example voice input.

FIG. 2C is a diagram of an example voice input 280 that may be processed by an NMD or an NMD-equipped playback device. The voice input 280 may include a keyword portion 280*a* and an utterance portion 280*b*. The keyword portion 280*a* may include a wake word or a local keyword.

In the case of a wake word, the keyword portion 280*a* corresponds to detected sound that caused a VAS wake-word event. In practice, a wake word is typically a predetermined nonce word or phrase used to "wake up" an NMD and cause it to invoke a particular voice assistant service ("VAS") to interpret the intent of voice input in detected sound. For example, a user might speak the wake word "Alexa" to invoke the AMAZON® VAS, "Ok, Google" to invoke the GOOGLE® VAS, or "Hey, Siri" to invoke the APPLE® VAS, among other examples. In practice, a wake word may also be referred to as, for example, an activation-, trigger-, wakeup-word or -phrase, and may take the form of any suitable word, combination of words (e.g., a particular phrase), and/or some other audio cue.

The utterance portion 280*b* corresponds to detected sound that potentially comprises a user request following the keyword portion 280*a*. An utterance portion 280*b* can be processed to identify the presence of any words in detected-sound data by the NMD in response to the event caused by the keyword portion 280*a*. In various implementations, an underlying intent can be determined based on the words in the utterance portion 280*b*. In certain implementations, an underlying intent can also be based or at least partially based on certain words in the keyword portion 280*a*, such as when keyword portion includes a command keyword. In any case, the words may correspond to one or more commands, as well as a certain command and certain keywords.

A keyword in the voice utterance portion 280*b* may be, for example, a word identifying a particular device or group in the MPS 100. For instance, in the illustrated example, the keywords in the voice utterance portion 280*b* may be one or more words identifying one or more zones in which the music is to be played, such as the Living Room and the Dining Room (FIG. 1A). In some cases, the utterance portion 280*b* may include additional information, such as detected pauses (e.g., periods of non-speech) between words spoken by a user, as shown in FIG. 2C. The pauses may demarcate the locations of separate commands, keywords, or other information spoke by the user within the utterance portion 280*b*.

Based on certain command criteria, the NMD and/or a remote VAS may take actions as a result of identifying one or more commands in the voice input. Command criteria may be based on the inclusion of certain keywords within the voice input, among other possibilities. Additionally, state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

In some implementations, the MPS 100 is configured to temporarily reduce the volume of audio content that it is playing upon detecting a certain keyword, such as a wake word, in the keyword portion 280*a*. The MPS 100 may restore the volume after processing the voice input 280. Such a process can be referred to as ducking, examples of which are disclosed in U.S. patent application Ser. No. 15/438,749, incorporated by reference herein in its entirety.

Figure 2D:
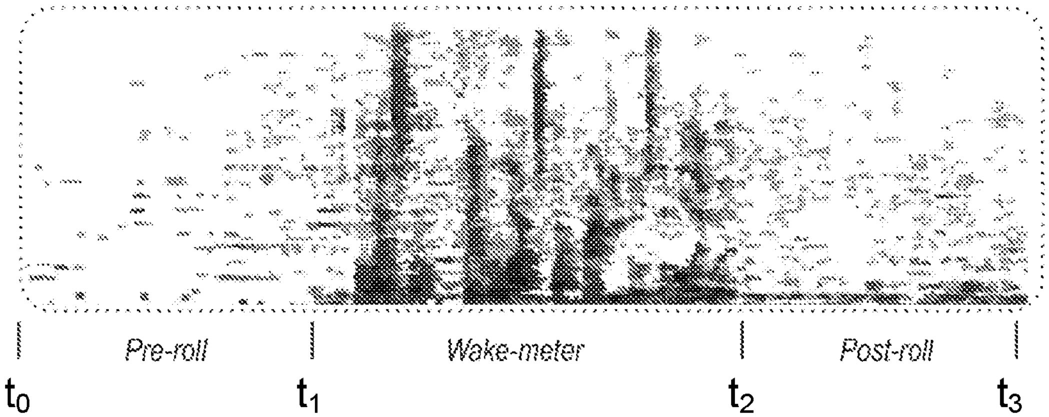
FIG. 2D is a graph depicting an example sound specimen in accordance with aspects of the disclosure.

FIG. 2D shows an example sound specimen. In this example, the sound specimen corresponds to the sound-data stream (e.g., one or more audio frames) associated with a spotted wake word or command keyword in the keyword portion 280*a* of FIG. 2A. As illustrated, the example sound specimen comprises sound detected in an NMD's environment (i) immediately before a wake or command word was spoken, which may be referred to as a pre-roll portion (between times $t_0$ and $t_1$), (ii) while a wake or command word was spoken, which may be referred to as a wake-meter portion (between times $t_1$ and $t_2$), and/or (iii) after the wake or command word was spoken, which may be referred to as a post-roll portion (between times $t_2$ and $t_3$). Other sound specimens are also possible. In various implementations, aspects of the sound specimen can be evaluated according to an acoustic model which aims to map mels/spectral features to phonemes in a given language model for further processing. For example, automatic speech recognition (ASR) may include such mapping for command-keyword detection. Wake-word detection engines, by contrast, may be precisely tuned to identify a specific wake-word, and a downstream action of invoking a VAS (e.g., by targeting only nonce words in the voice input processed by the playback device).

ASR for local keyword detection may be tuned to accommodate a wide range of keywords (e.g., 5, 10, 100, 1,000, 10,000 keywords). Local keyword detection, in contrast to wake-word detection, may involve feeding ASR output to an onboard, local NLU which together with the ASR determine when local keyword events have occurred. In some implementations described below, the local NLU may determine an intent based on one or more keywords in the ASR output produced by a particular voice input. In these or other implementations, a playback device may act on a detected command keyword event only when the playback devices determines that certain conditions have been met, such as environmental conditions (e.g., low background noise).

b. Example Playback Device Configurations

Figure 3A:
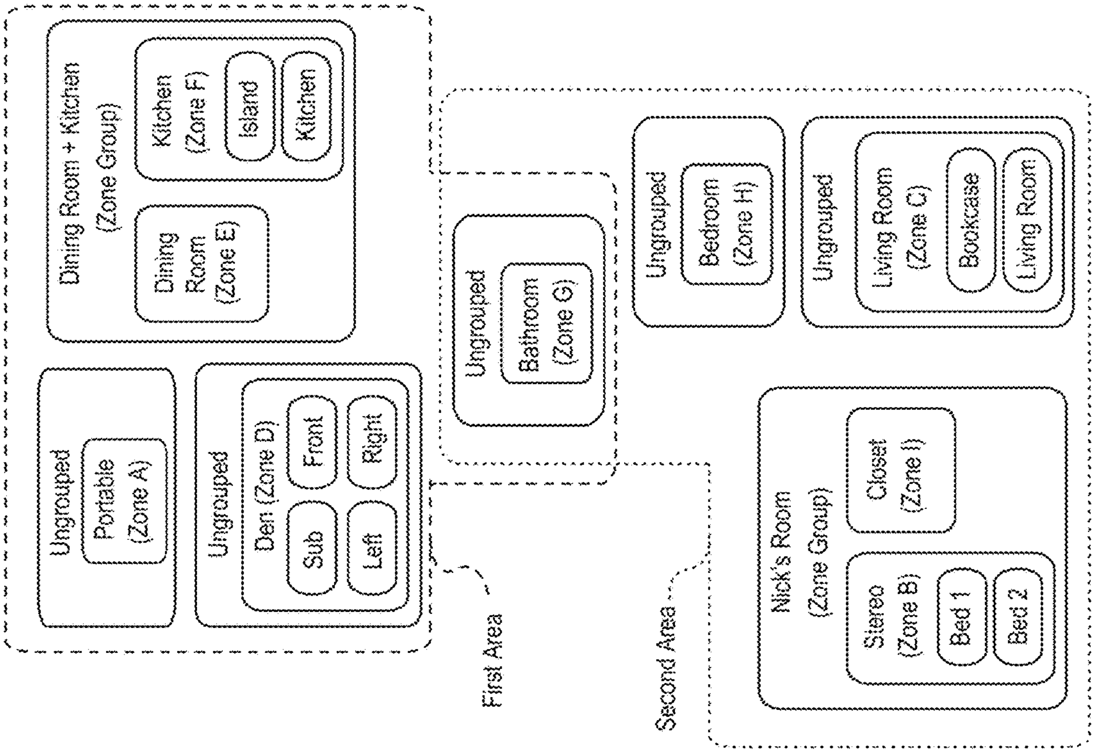
FIGS. 3A, 3B, 3C, 3D and 3E are diagrams showing example playback device configurations in accordance with aspects of the disclosure.

FIGS. 3A-3E show example configurations of playback devices. Referring first to FIG. 3A, in some example instances, a single playback device may belong to a zone. For example, the playback device 102*c* (FIG. 1A) on the Patio may belong to Zone A. In some implementations described below, multiple playback devices may be "bonded" to form a "bonded pair," which together form a single zone. For example, the playback device 102*f* (FIG. 1A) named "Bed 1" in FIG. 3A may be bonded to the playback device 102*g* (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102*d* named "Bookcase" may be merged with the playback device 102*m* named "Living Room" to form a single Zone C. The merged playback devices 102*d* and 102*m* may not be specifically assigned different playback responsibilities. That is, the merged playback devices 102*d* and 102*m* may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102*m* (as shown). In another example, Zone C may instead take on the name of the Bookcase device 102*d*. In a further example, Zone C may take on a name that is some combination of the Bookcase device 102*d* and Living Room device 102*m*. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102*f* in the master bedroom 101*h* (FIG. 1A) and the Bed 2 device may be the playback device 102*g* also in the master bedroom 101*h* (FIG. 1A).

Figure 3B:
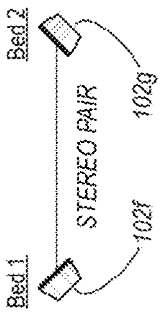

As noted above, playback devices that are bonded may have different playback responsibilities, such as playback responsibilities for certain audio channels. For example, as shown in FIG. 3B, the Bed 1 and Bed 2 devices 102*f* and 102*g* may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Figure 3C:
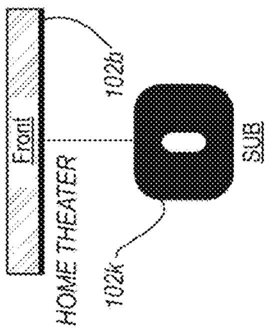
Figure 3D:
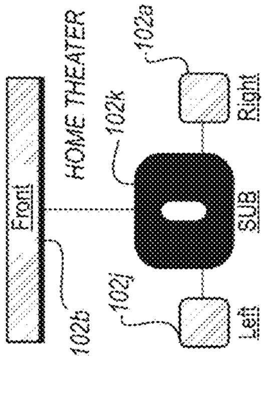

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system. The bonded playback devices 102*a*, 102*b*, 102*j*, and 102*k* may form a single Zone D (FIG. 3A).

Figure 3E:
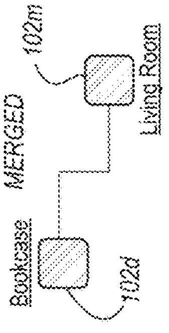

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102*d* and 102*m* in the Living Room merged, which would result in these devices being represented by the single UI entity of Zone C. In one embodiment, the playback devices 102*d* and 102*m* may playback audio in synchrony, during which each outputs the full range of audio content that each respective playback device 102*d* and 102*m* is capable of rendering.

In some embodiments, a stand-alone NMD may be in a zone by itself. For example, the NMD 103*h* from FIG. 1A is named "Closet" and forms Zone I in FIG. 3A. An NMD may also be bonded or merged with another device so as to form a zone. For example, the NMD device 103*f* named "Island" may be bonded with the playback device 102*i* Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of play back devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the MPS 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs. During operation, one or more playback zones in the environment of FIG. 1A may each be playing different audio content. For instance, the user may be grilling in the Patio zone and listening to hip hop music being played by the playback device 102*c*, while another user may be preparing food in the Kitchen zone and listening to classical music being played by the playback device 102*i*. In another example, a playback zone may play the same audio content in synchrony with another playback zone.

For instance, the user may be in the Office zone where the playback device 102*n* is playing the same hip-hop music that is being playing by playback device 102*c* in the Patio zone. In such a case, playback devices 102*c* and 102*n* may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102*c* from the Patio zone to the Office zone, the Office zone may now include both the playback devices 102*c* and 102*n*. In some cases, the user may pair or group the moved playback device 102*c* with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102*i* and 102*l* may render audio content in synchrony. As another example, bonded playback devices in the Den zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103*a* or 103*b* (FIG. 1B) to control the Den zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the MPS 100.

c. Example Controller Devices

FIG. 4 is a functional block diagram illustrating certain aspects of a selected one of the controller devices 104 of the MPS 100 of FIG. 1A. Such controller devices may also be referred to herein as a "control device" or "controller." The controller device shown in FIG. 4 may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4, the controller device 104 also includes a user interface 440 that is generally configured to facilitate user access and control of the MPS 100. The user interface 440 may include a touch-screen display or other physical interface configured to provide various graphical controller interfaces, such as the controller interfaces 540*a* and 540*b* shown in FIGS. 5A and 5B. Referring to FIGS. 5A and 5B together, the controller interfaces 540*a* and 540*b* includes a playback control region 542, a playback zone region 543, a playback status region 544, a playback queue region 546, and a sources region 548. The user interface as shown is just one example of an interface that may be provided on a network device, such as the controller device shown in FIG. 4, and accessed by users to control a media playback system, such as the MPS 100. Other user interfaces of varying formats, styles, and interactive sequences may alternatively be implemented on one or more network devices to provide comparable control access to a media playback system.

The playback control region 542 (FIG. 5A) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 542 may also include selectable icons that, when selected, modify equalization settings and/or playback volume, among other possibilities.

The playback zone region 543 (FIG. 5B) may include representations of playback zones within the MPS 100. The playback zones regions 543 may also include a representation of zone groups, such as the Dining Room+Kitchen zone group, as shown.

In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected playback zone or zone group may be visually distinguished on a controller interface, such as within the playback zone region 543 and/or the playback status region 544. The graphical representations may include track title, artist name, album name, album year, track length, and/or other relevant information that may be useful for the user to know when controlling the MPS 100 via a controller interface.

The playback queue region 546 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 5A and 5B, the graphical representations of audio content in the playback queue region 646 (FIG. 5A) may include track titles, artist names, track lengths, and/or other relevant information associated with the audio content in the play back queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 548 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs **102*a* and 102*b* in the Living Room shown in FIG. 1A, and a second VAS to the NMD 103*f*** in the Kitchen. Other examples are possible.

d. Example Audio Content Sources

The audio sources in the sources region 548 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

Figure 6:
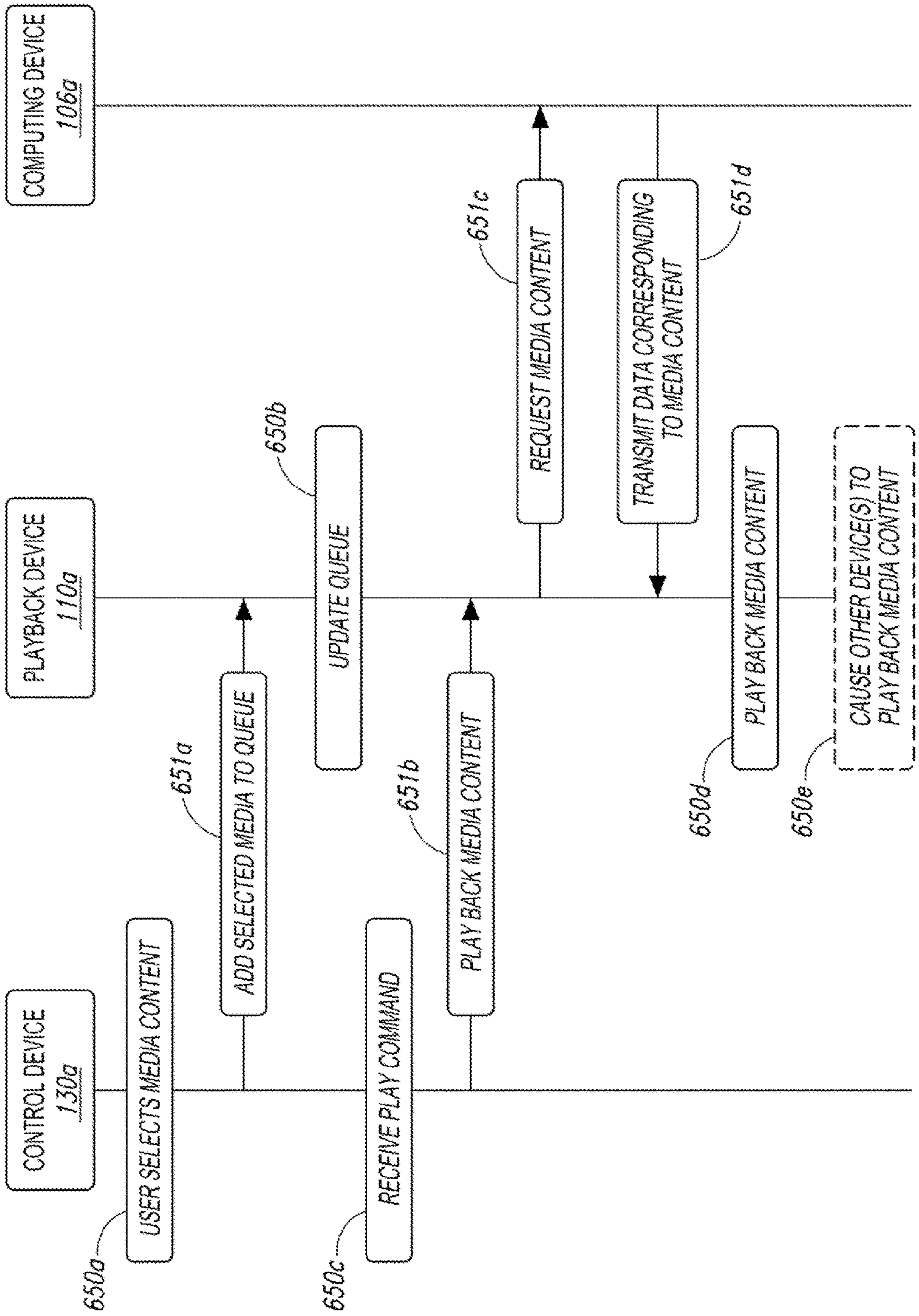
FIG. 6 is a message flow diagram of a media playback system.

FIG. 6 is a message flow diagram illustrating data exchanges between devices of the MPS 100. At step 650*a*, the MPS 100 receives an indication of selected media content (e.g., one or more songs, albums, playlists, podcasts, videos, stations) via the control device 104. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 104 transmits a message 651*a* to the playback device 102 (FIGS. 1A-1C) to add the selected media content to a playback queue on the playback device 102.

At step 650*b*, the playback device 102 receives the message 651*a* and adds the selected media content to the playback queue for play back.

At step 650*c*, the control device 104 receives input corresponding to a command to play back the selected media content. In response to receiving the input corresponding to the command to play back the selected media content, the control device 104 transmits a message 651*b* to the playback device 102 causing the playback device 102 to play back the selected media content. In response to receiving the message 651*b*, the playback device 102 transmits a message 651*c* to the computing device 106 requesting the selected media content. The computing device 106, in response to receiving the message 651*c*, transmits a message 651*d* comprising data (e.g., audio data, video data, a URL, a URI) corresponding to the requested media content.

At step 650*d*, the playback device 102 receives the message 651*d* with the data corresponding to the requested media content and plays back the associated media content.

At step 650*e*, the playback device 102 optionally causes one or more other devices to play back the selected media content. In one example, the playback device 102 is one of a bonded zone of two or more players (FIG. 1M). The playback device 102 can receive the selected media content and transmit all or a portion of the media content to other devices in the bonded zone. In another example, the playback device 102 is a coordinator of a group and is configured to transmit and receive timing information from one or more other devices in the group. The other one or more devices in the group can receive the selected media content from the computing device 106, and begin playback of the selected media content in response to a message from the playback device 102 such that all of the devices in the group play back the selected media content in synchrony.

Within examples, such messages may conform to one or more protocols or interfaces (e.g., an Application Programming Interface). A platform API may support one or more namespaces that include controllable resources (e.g., the playback devices 102 and features thereof). Various functions may modify the resources and thereby control actions on the playback devices 102. For instance, HTTP request methods such as GET and POST may request and modify various resources in a namespace. Example namespaces in a platform API include playback (including controllable resources for playback), playbackMetadata (including metadata resources related to playback), volume (including resources for volume control), playlist (including resources for queue management), and groupVolume (including resources for volume control of a synchrony group), among other examples. Among other examples, such messages may conform to a standard, such as universal-plug-and-play (uPnP).

III. Example Playback Device

Figure 7A:
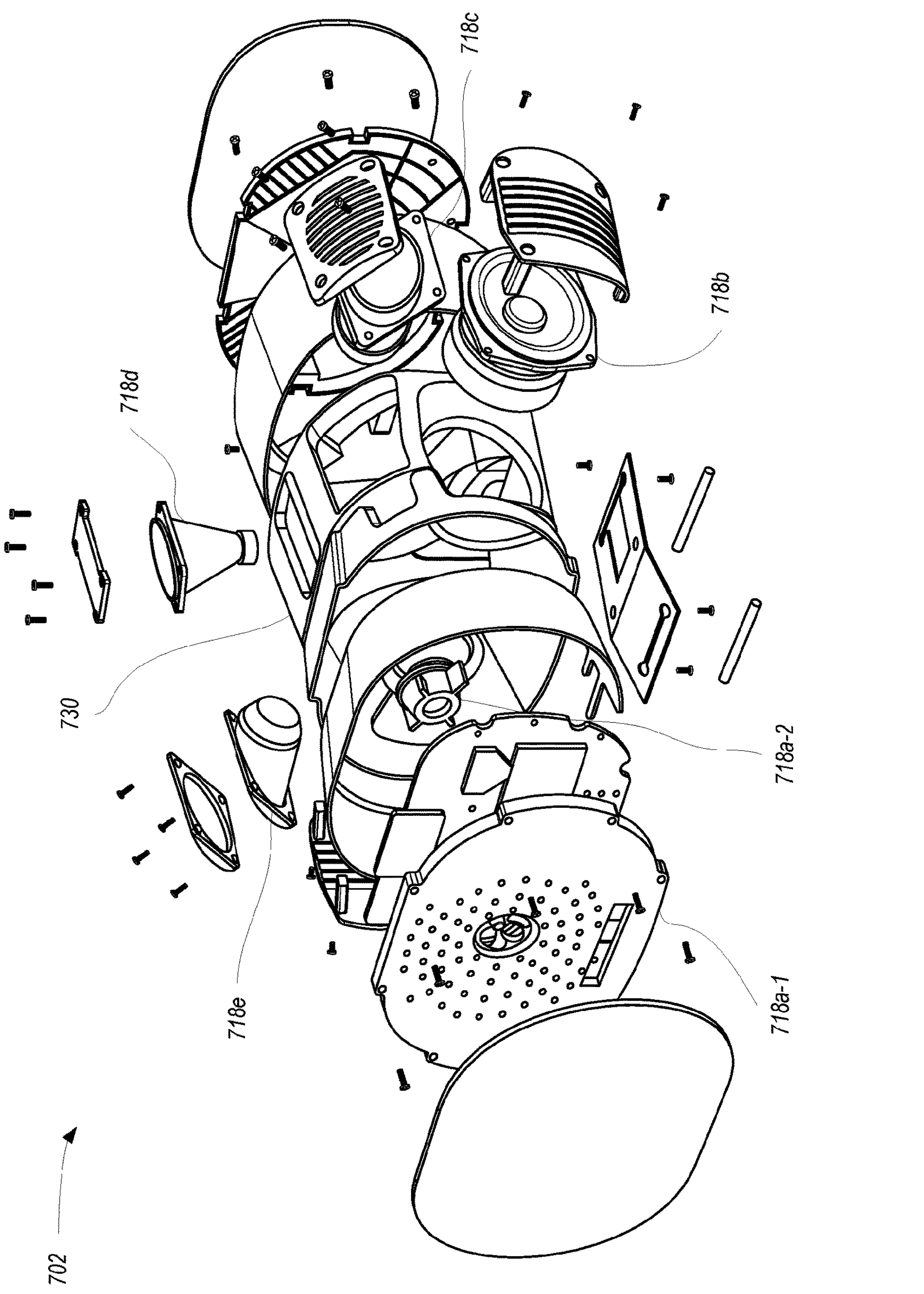
FIGS. 7A, 7B, 7C, and 7D are diagrams showing an example playback device configuration in accordance with aspects of the disclosure.

In example implementations, example primary-ambient playback techniques described herein may be carried out with a playback device that includes multiple audio transducers. By way of illustration, FIG. 7A is an exploded view of a playback device 702 that includes a plurality of speakers 718. In particular, the speakers 718 include a forward firing transducer 718*a*, a side-firing transducer 718*b*, a side-firing transducer 718*c*, an upward-firing transducer 718*d*, a side-firing transducer 718*e*, and a side-firing transducer 718*f* (not shown). The speakers 718 are carried in a housing 730. The playback device 702 may otherwise include components the same as or similar to the playback device 102 (FIG. 2A), which may be carried by the housing 730.

Figure 7B:
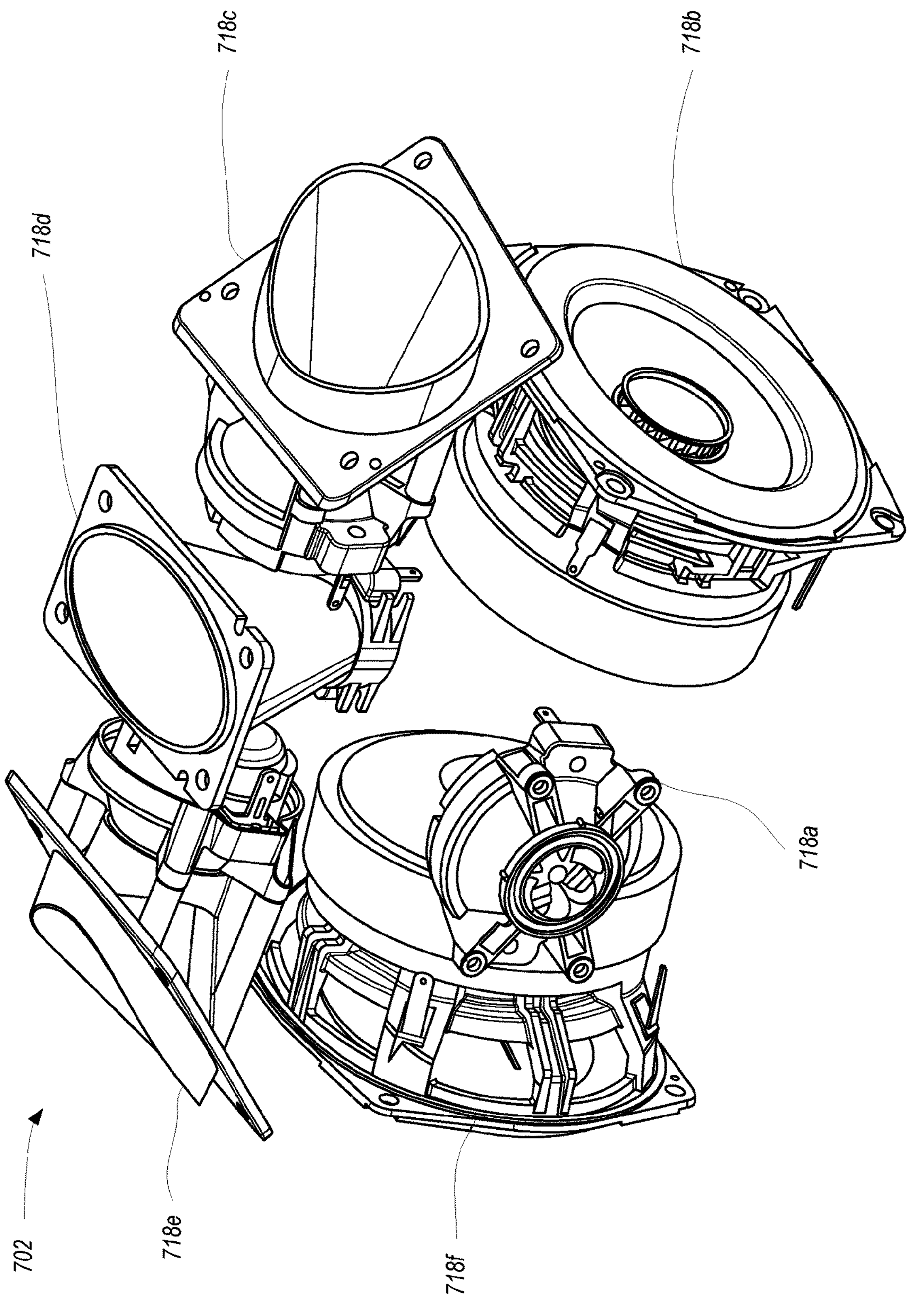

As shown in the exploded view of FIG. 7A, the forward-firing transducer 718*a* is comprised of several components, including a first component 718*a*-1 and a second component 718*a*-*b*. In assembly, the first component 718*a*-1 and the second component 718*a*-*b* are joined to form the forward-firing transducer 718*a*. In other examples, the side-firing transducer 718*a* may be formed from a single component. Within example implementations, the other speakers 718 as well as the other components may be formed from one or more multiple components as well Within examples, the speakers may have a particular arrangement relative to one another. FIG. 7B is a partial view of the playback device 702 which illustrates the speakers 718 in an example arrangement. As shown, the forward firing transducer 718*a* is oriented in a first direction (i.e., forward). The side-firing transducer 718*b* and the side-firing transducer 718*f* are implemented as respective woofers and are oriented in second and third directions that are approximately 180° from one another and approximately 90° from the first direction in the horizontal plane.

In this example, three of the speakers 718 are implemented as tweeters. These include the side-firing transducer

718*c* and the side-firing transducer 718*e*, which are similarly oriented as the side-firing transducer 718*b* and the side-firing transducer 718*b*. The tweeters also include the upward-firing transducer 718*d*, which is oriented in a fourth direction approximately 90° from the first direction in the vertical plane. As shown, the side-firing transducer 718*c*, the side-firing transducer 718*e*, the upward-firing transducer 718*d* also include respective horns.

The arrangements of the speakers 718 may have particular acoustic effects. For instance, the arrangement of the side-firing transducer 718*c* and the side-firing transducer 718*e* may provide an ambient effect when surround content is output via the side-firing transducer 718*c* and the side-firing transducer 718*e* respectively. The similar arrangement of the side-firing transducers 718*b* and the side-firing transducer 718*f* may have a similar effect. In contrast, the forward-firing transducer 718*a* has a relatively more direct sound (assuming that the playback device 702 is oriented such that the primary direction of output 718*a* is more oriented toward the user(s) relative to the primary direction of output of the side-firing transducers 718.

Figure 7C:
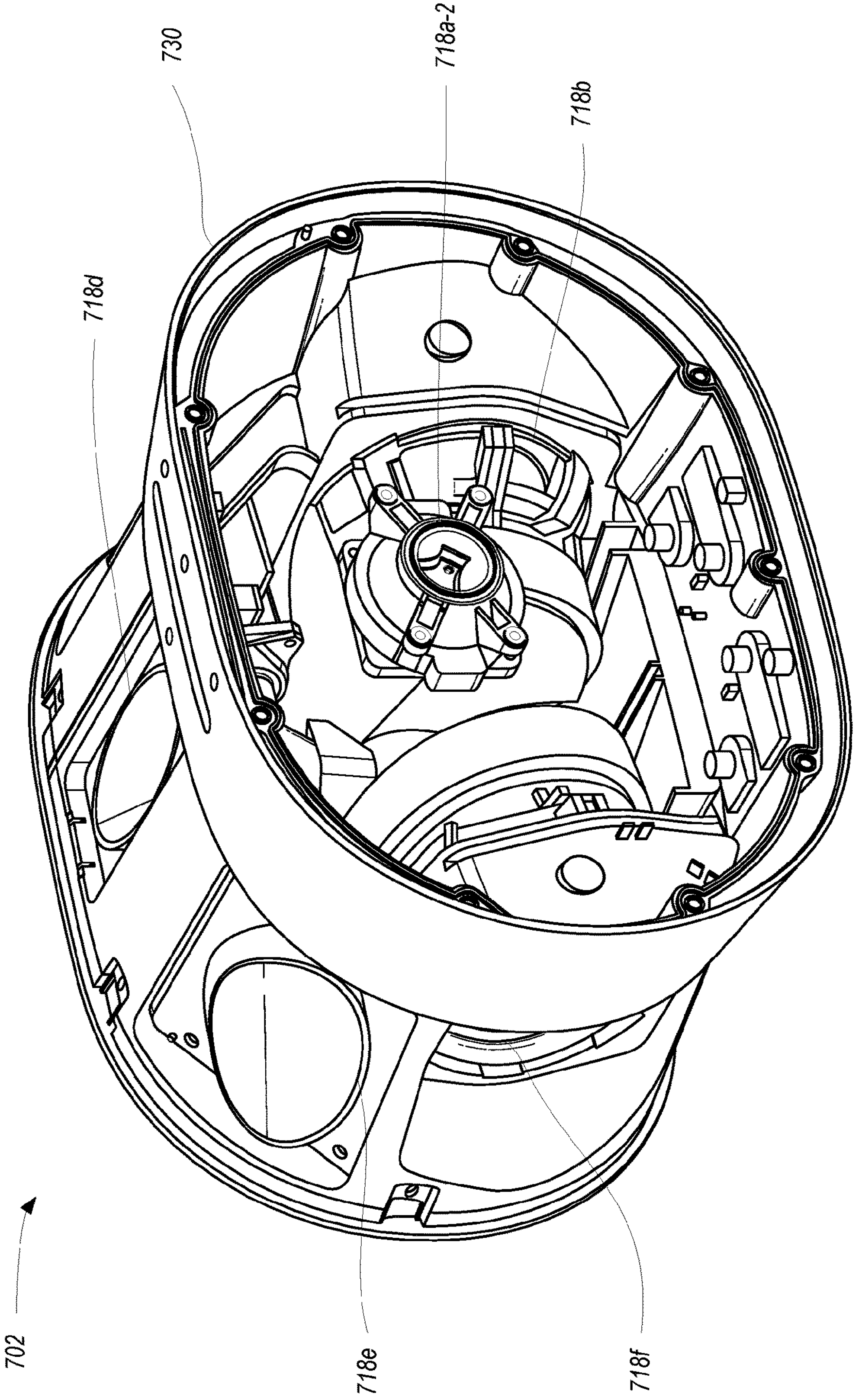

To provide further illustration, FIG. 7C is a view showing the playback device 702 as partially-assembled. FIG. 7C shows the housing 730 carrying the side-firing transducer 718*b*, the upward-firing transducer 718*d*, the side-firing transducer 718*e*, and the side-firing transducer 718*e*, as well as the second component 718*a*-2 of the forward-firing transducer 718*a*. The first component 718*a*-1 is not shown in FIG. 7C in order to provide a partial interior view of the housing 730.

Figure 7D:
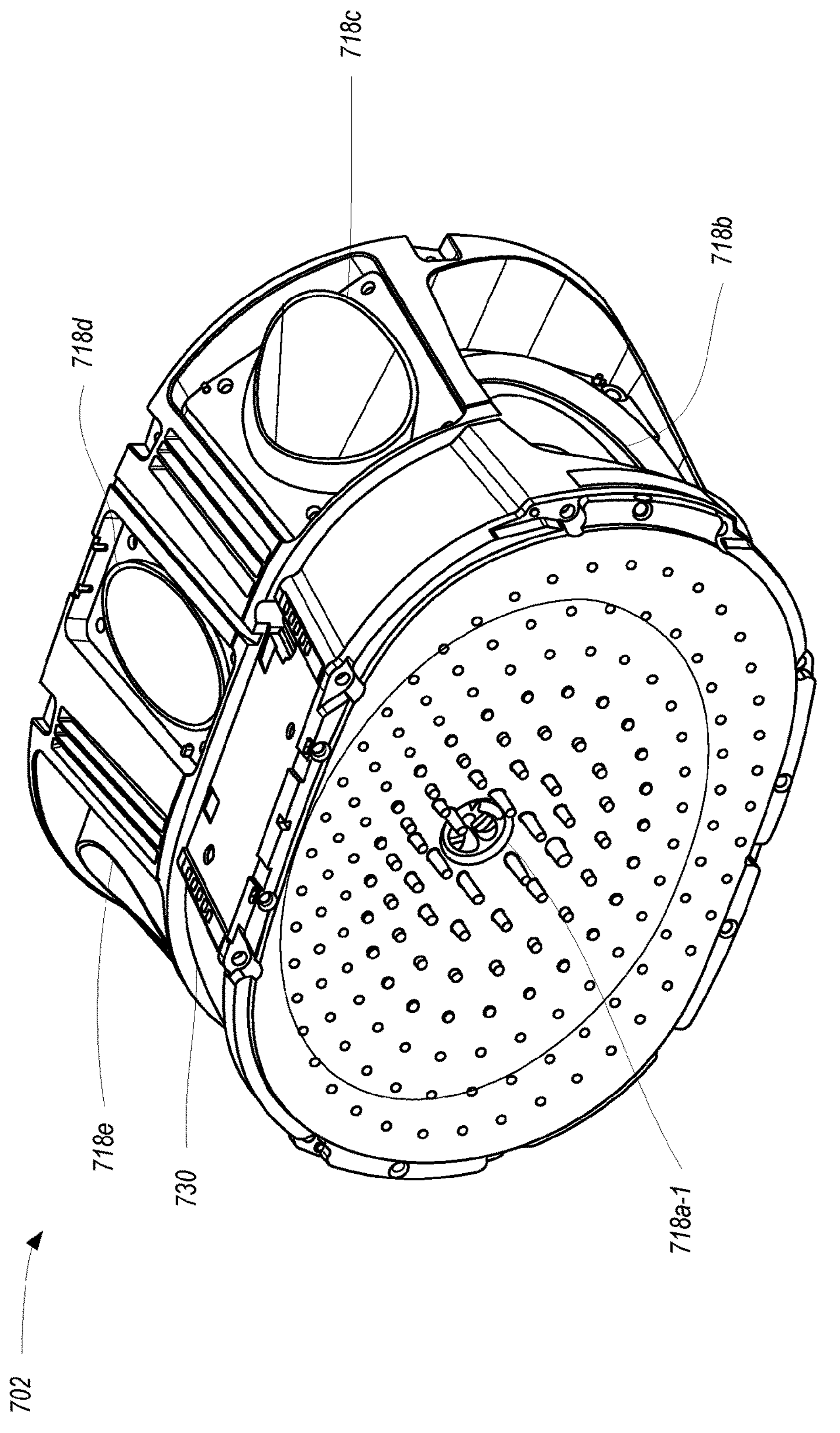

FIG. 7D is a further view showing the playback device 702 also as partially-assembled (without the exterior speakers grilles and trim). FIG. 7D shows the housing 730 carrying the side-firing transducer 718*b*, the side-firing transducer 718*c*, the upward-firing transducer 718*d*, and the side-firing transducer 718*e*. In this view, the first component 718*a*-1 of the forward-firing transducer 718*a* is connected to the second component 718*a*-2.

IV. Example Primary-Ambient Playback

Examples described herein relate to primary-ambient playback with playback devices having certain arrangements of speakers. In particular, such examples may be used with playback devices that include a forward-firing transducer, at least one first side-firing transducer, and at least one second side-firing transducer. An example of such a playback device is the playback device 702 illustrated in FIGS. 7A, 7B, 7C, and 7D. Other playback devices with different arrangements of audio transducers may be suitable as well.

Figure 8:
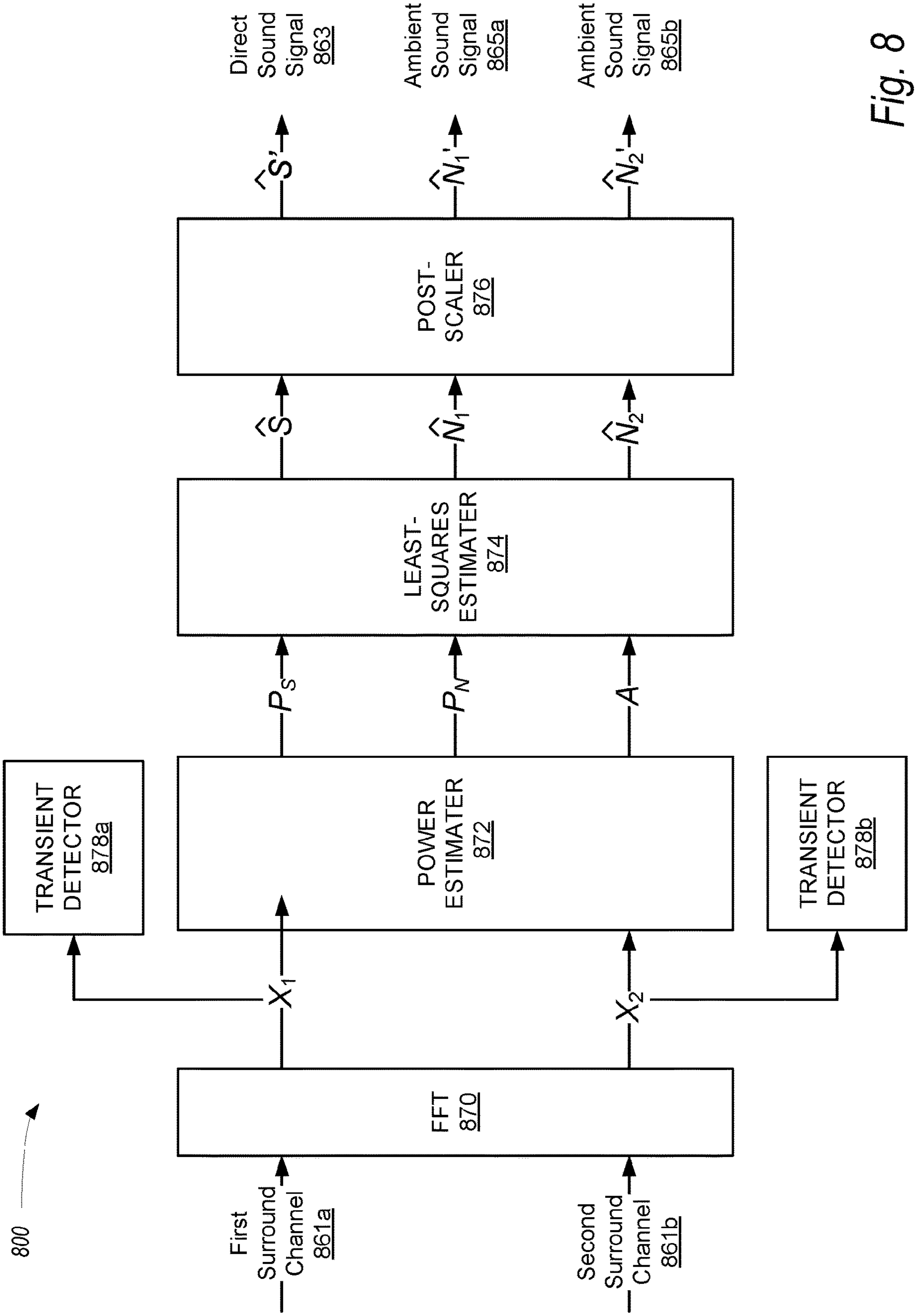
FIG. 8 is a functional block diagram illustrating example primary-ambient decomposition in accordance with aspects of the disclosure.

In examples, such playback devices may reproduce ambient portions of surround audio content with the side-firing transducers and direction portions of the surround audio content with the forward-firing transducers. The playback device may use a primary-ambient decomposition technique to separate a surround audio channel into a primary signal and an ambient signal. FIG. 8 is a functional block diagram showing an example primary-ambient decomposer 800 that performs primary-ambient decomposition of a first surround channel 861*a* (e.g., a left or right surround channel) and a second surround channel 861*b* (e.g., the other of the left or right surround channel), which are referred to together as surround channels 861. As shown in FIG. 8, the example primary-ambient decomposer 800 yields a direct sound signal 863, as well as a first ambient sound signal 865*a* and a second ambient sound signal 865*b*, which may be referred to together as ambient sound signals 865.

The example primary-ambient decomposer 800 involves multi-channel analysis of the surround channels 861. In the example decomposition, the surround channels 861 can be described as the sum of the direct sound s and the ambient sound n. This can be described mathematically for a single auditory event as:

$$x_1(n) = s(n) + n_1(n)$$

$$x_2(n) = as(n) + n_2(n)$$

where $x_1$ and $x_2$ represent the first surround channel 861*a* and the second surround channel 861*b*, respectively, and a is a factor corresponding to a direction of the direct sound s.

In order to decompose the surround channels 861 in adaptive scenarios with multiple concurrently active sources, the decomposition is carried out independently in a number of frequency bands and adaptively in time. This can be represented mathematically as:

$$X_1(i, k) = S(i, k) + N_1(i, k)$$

$$X_2(i, k) = A(i, k)S(i, k) + N_2(i, k)$$

where i is the subband index and k is the subband time index. In each time-frequency tile with indices i and k, the signals S, $N_1$, $N_2$, and A are estimated independently.

Via the example primary-ambient decomposer 800, the surround channels are converted into the short-time Fourier transform (STFT) domain using a fast Fourier transform (FFT) 870, as shown in FIG. 8. Primary-ambient decomposition in the STFT domain may lessen processing requirements of decomposition relative to other decomposition techniques and may render such decomposition more practical on compact playback devices, such as the playback device 702 (FIGS. 7A-7D). Example playback devices, such as the playback device 702 may have limited processing power due to size, power consumption, and/or cost considerations, among other possible considerations. Similarly, use of FFT to perform the transform may require less computational complexity, which may have similar benefits, among other possible benefits.

The primary-ambient decomposer 800 includes a power estimator 872, which estimates the power of the direct sound $P_S$ and the power of the ambient sound $P_N$, as well as A. The power of the direct sound $P_S$, the power of the ambient sound $P_N$, and A are computed as a function of the estimated power of the surround signals 861, which are denoted $P_{X_1}$, $P_{X_2}$ as well as the cross normalized cross correlation Φ. The estimated power of the surround signals 861 can be expressed mathematically as:

$$X_1 = E\{X_1^2(i, k)\}$$

$$X_2 = E\{X_2^2(i, k)\}$$

where E is a short-time averaging operation. The normalized cross correlation Φ can be represented mathematically as:

$$\Phi(i, k) = \frac{E\{X_1(i, k)X_2(i, k)\}}{\sqrt{E\{X_1^2(i, k)\}E\{X_2^2(i, k)\}}}$$

The power of the direct sound $P_S$, the power of the ambient sound $P_N$, and A are then computed as a function of the estimated power of the surround signals 861 and the normalized cross correlation. The known and unknown variables are related as follows:

$$P_{X_1} = P_S + P_N$$

$$P_{X_2} = A^2 P_S + P_N$$

$$\Phi = \frac{aS}{\sqrt{P_{X_1} P_{X_2}}}$$

Then, solving for A, $P_S$ and $P_N$ yields the following:

$$A = \frac{B}{2C}$$

$$P_S = \frac{2C^2}{B}$$

$$P_N = X_1 - \frac{2C^2}{B}$$

with $$B = P_{X_2} - P_{X_1} + \sqrt{(P_{X_1} - P_{X_2})^2 + 4 P_{X_2} \Phi^2}$$

$$C = \Phi \sqrt{P_{X_1} P_{X_2}}$$

by way of illustration.

The primary-ambient decomposer 800 further includes a least squares estimator 874, which computes a least-squares estimation of the direct sound S, the ambient sound $N_1$ and $N_2$, as a function of the power of the direct sound $P_S$, the power of the ambient sound $P_N$, and A. For each tile i and k, the direct sound S is estimated as:

$$\hat{S} = w_1 X_1 + w_2 X_2 = w_1(S + N_1) + w_2(AS + N_2)$$

where $w_1$ and $w_2$ are real valued weights. The estimation error $E_S$ is:

$$E_S = (1 - w_1 - w_2 A)S - w_1 N_1 - w_2 N_2$$

which aids in computing the weights $w_1$ and $w_2$. Under least-mean-squares, the weights $w_1$ and $w_2$ are optimal when the error $E_S$ is orthogonal to $X_1$ and $X_2$ such that:

$$E_S\{E_S X_1\}=0$$

$$E_S\{E_S X_2\}=0$$

which yields two equations:

$$(1 - w_1 - w_2 A)P_s - w_1 P_N = 0$$

$$A(1 - w_1 - w_2 A)P_s - w_2 P_N = 0$$

from which the weights $w_1$ and $w_2$ can be derived. In particular, the weights $w_1$ and $w_2$ can be computed as:

$$w_1 = \frac{P_s P_N}{(A^2+1)P_s P_N + P_N^2}$$

$$w_2 = \frac{A P_s P_N}{(A^2+1)P_s P_N + P_N^2}$$

such that the direct sound $\hat{S}$ can be computed.

Further, the least squares estimator 874 may estimate the ambient sound $\hat{N}_1$ as:

$$\hat{N}_1 = w_3 X_1 + w_4 X_2 = w_3(S + N_1) + w_4(AS + N_2)$$

with some estimation error $E_{N_1}$. In particular, the estimation error $E_{N_1}$ is:

$$E_{N_1} = (-w_3 - w_4 A)S - (1 - w_3)N_1 - w_2 N_2$$

which aids in computing the weights $w_3$ and $w_4$. Similar to the weights $w_1$ and $w_2$, the weights $w_3$ and $w_4$ are computed such that the estimation error is orthogonal to the surround channels 861, which yields:

$$w_3 = \frac{A^2 P_s P_N + P_N^2}{(A^2+1)P_s P_N + P_N^2}$$

$$w_4 = \frac{-A P_s P_N}{(A^2+1)P_s P_N + P_N^2}$$

such that the ambient sound $N_1$ can be computed.

Similarly, the least squares estimator 874 may estimate the ambient sound $\hat{N}_2$ as:

$$\hat{N}_2 = w_5 X_1 + w_6 X_2 = w_5(S + N_1) + w_6(AS + N_2)$$

with some estimation error $E_{N_2}$. In particular, the estimation error $E_{N_2}$ is:

$$E_{N_2} = (-w_3 - w_4 A)S - (1 - w_3)N_1 - w_2 N_2$$

which aids in computing the weights $w_5$ and $w_6$. Similar to the weights $w_1$, $w_2$, $w_3$, and $w_4$, the weights $w_5$ and we are computed such that the estimation error is orthogonal to the surround channels 861, which yields:

$$w_5 = \frac{-A P_s P_N}{(A^2+1)P_s P_N + P_N^2}$$

$$w_3 = \frac{P_s P_N + P_N^2}{(A^2+1)P_s P_N + P_N^2}$$

such that the ambient sound $\hat{N}_2$ can be computed.

Within examples, the primary-ambient decomposer 800 further includes a post-scaler 876. The post-scaler 876 scales the least-squares estimates $\hat{S}$, $\hat{N}_1$, and $\hat{N}_2$ such that the power of the least-squares estimates $\hat{S}$, $\hat{N}_1$, and $\hat{N}_2$ is equal to the power of the direct sound $P_S$ and $P_N=P_{N_1}=P_{N_2}$. To yield an estimate of S with power $P_S$, the post-scaler 876 may scale $\hat{S}$ as follows:

$$\hat{S}' = \frac{\sqrt{P_s}}{(w_1 + aw_2)^2 P_S + (w_1^2 + w_2^2) P_N} \hat{S}$$

by way of illustration. Similarly, the post-scaler 876 may scale $\hat{N}_1$, and $\hat{N}_2$ as follows:

$$\hat{N}'_1 = \frac{\sqrt{P_N}}{(w_3 + aw_4)^2 P_S + (w_3^2 + w_4^2) P_N} \hat{S}$$

$$\hat{N}'_2 = \frac{\sqrt{P_N}}{(w_5 + aw_6)^2 P_S + (w_5^2 + w_6^2) P_N} \hat{S}$$

by way of illustration.

As shown in FIG. 8, the post-scaler 876 yields the direct sound signal 863 ($\hat{S}'$), as well as the ambient sound signals 865 ($\widehat{N'}_1$ and $\widehat{N'}_2$). In operation, the playback device 702 may output the direct sound signal 863 via the transducer 718*a* (FIGS. 7A-7D), which is forward-firing. The playback device 702 may output the ambient sound signals 865 via the transducer 718*b* and the transducer 718*f* and/or the transducer 718*c* and the transducer 718*e*, which are each side-firing. In this manner, the playback device 702 may provide both ambient and direct sound behavior.

As noted above, the example primary-ambient decomposer 800 is adaptive in time. In some examples, when an auditory event occurs in the surround channels 861, the primary-ambient decomposer 800 might not adapt quickly enough to identify all of the auditory event as primary audio. In this case, at least a portion of the auditory event may be output as the ambient sound signals 865, rather than as the direct sound signal 863.

To enable faster transitions, the primary-ambient decomposer 800 may include a transient detector 878*a* and/or a transient detector 878*b* (referred to together as a transient detector 878) to detect transients in the surround channels 861. When a transient is detected in the surround channels 861, the primary-ambient decomposer 800 switches to primary output of the surround channels 861 via the direct sound signal 863. In particular, the primary-ambient decomposer 800 may restart adaptation of the primary-ambient decomposition, which may shift the separation fully to the direct sound signal 863. The primary-ambient decomposer 800 may then continue with adaptation to the surround channels 861 during further decomposition.

By way of illustration, as shown in FIG. 8, the transient detector 878 may operate in the STFT domain. Example transient detection techniques include edge detection.

Mathematically, edge detection may be described as follows:

$$T_-(i, k) = |X(i, k)| - |X(i-1, k)|$$

$$T_+(i, k) = |X(i, k)| - |X(i+1, k)|$$

by way of illustration. Combining these functions and applying smoothing yields a detection function F as follows:

$$F(i, j) = .5\left\{\sum_{k=j-v}^{j+v} \{1 + \operatorname{sgn}(T_-(i, k))\}.T_-(i, k) + \{1 + \operatorname{sgn}(T_+(i, k))\}.T_+(i, k)\right\}$$

where $$\operatorname{sgn}(\theta) = \begin{cases} 1 \text{ if } \theta \geq 0 \\ -1 \text{ if } \theta < 0 \end{cases}$$

Further, within examples, the transient detector 878 may use an adaptive threshold for the detection function. Mathematically, the threshold may be represented as λ as follows:

$$\lambda(i, j) = \beta \times \frac{\sum_{l=i-\tau}^{i+\tau} F(l, j)}{2\tau + 1}$$

where β is a parameter to control the strength of transients to detect. Under this example, a time varying threshold for every time-frequency bin is calculated. A transient may be detected if the value of F at the bin is greater than the threshold λ(i,j), which can be described mathematically as:

$$\Gamma(i, j) = \begin{cases} 1 \text{ if } F(i, j) > \lambda(i, j) \\ 0 \text{ if } F(i, j) \leq \lambda(i, j) \end{cases}$$

as an example.

Figure 9:
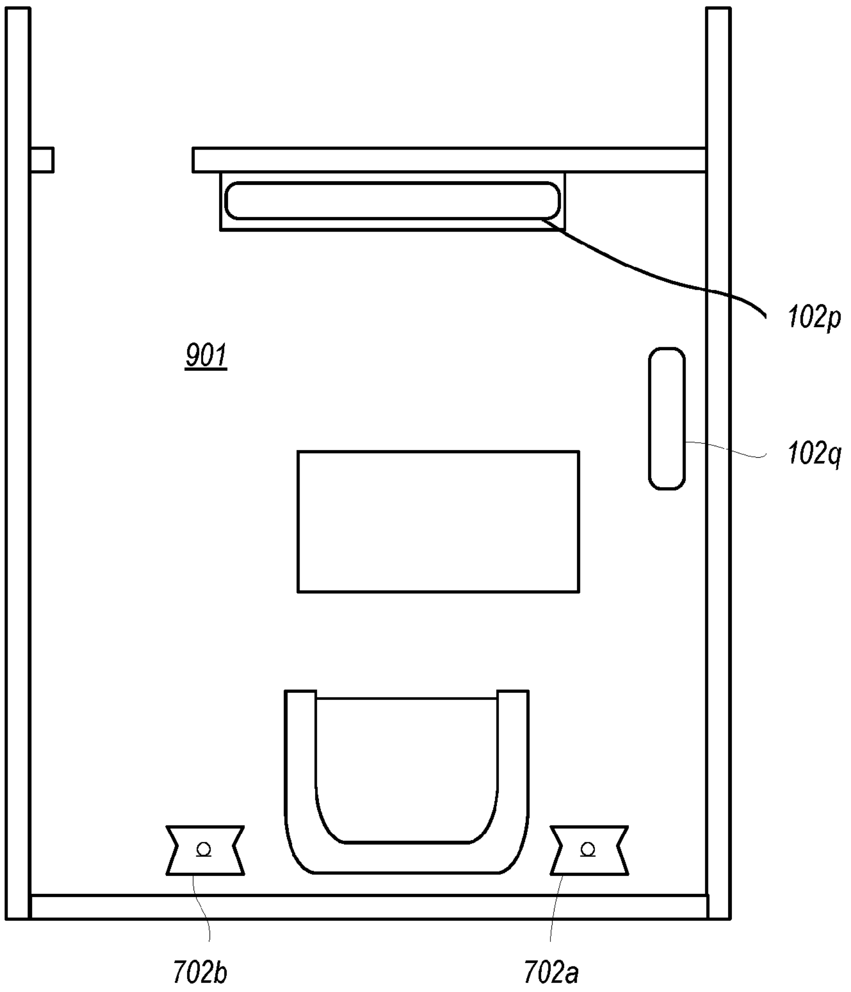
FIG. 9 is a diagram illustrating example surround configuration in accordance with aspects of the disclosure.

In some examples, two or more playback devices 702 may be in a bonded surround configuration (FIG. 3D). FIG. 9 illustrates a first playback device 702*a* and a second playback device 702*b* in an example zone 901 that also includes a playback device 102*p* (e.g., a soundbar) and a playback device 102*q* (e.g., a subwoofer). The example zone 901 may be, for example, an additional zone of the media playback system 100 (FIG. 1A). As described in connection with FIG. 3D, in a bonded surround configuration the playback device 102*p* is configured to output center and left and right front channels of surround audio content (e.g., 5.1), while the first playback device 702*a* and the second playback device 702*b* are configured to output surround channels of the surround audio content and the playback device 102*q* is configured to output bass frequencies of the surround audio content.

In an example, the playback device 102*p* may receive surround audio content via an input interface from a television or other audio/video device (e.g., a streaming box, a disc player, a video game console, or the like) and send the surround channels to the first playback device 702*a* and/or the second playback device 702*b* via a network such as the LAN 111 (FIG. 1B). In some examples, the first playback device 702*a* and the second playback device 702*b* independently perform primary-ambient decomposition on the surround channels. Alternatively, one playback device 702 (e.g., the first playback device 702*a* may perform primary-ambient decomposition on the surround channels) and then send the decomposed signals to the other playback device 702 (e.g., the playback device 702*b*) via the network.

In further examples, the playback device 102*p* may perform primary-ambient decomposition on the surround channels and then send the decomposed signals to the playback device(s) 702. This implementation may reduce processing load on the first playback device 702*a* and/or the second playback device 702*b* but may increase load on the network. In example implementations, the playback device 102*p* and the playback device(s) 702 may be reconfigurable based on the processing capability and network traffic to balance the network and processing loads among the devices. Further examples are possible as well.

While one goal of the primary-ambient decomposition is indirect playback of the ambient audio via side-firing transducers, in some cases, such a goal may be frustrated by obstructions within the environment. In some implementations, the playback device 702 is configured to detect obstructions (e.g., objects, walls or other boundaries) in proximity to the playback device 702. Obstacles within a minimum threshold distance (e.g., 30 cm) to one or more of the side-firing transducers may cause distortion or other undesirable effects on playback. At the same time, a user might not realize that such an obstacle is impacting playback and may instead believe that their device is malfunctioning. When an obstruction are detected, the playback device 702 may take action to reduce or mitigate its effect.

As noted above, a playback device may be positioned with a wall or other obstruction within a minimum threshold distance (e.g., 30 cm) to one or more of the side-firing transducers. In such cases, maximum directionality from these side-firing transducer(s) might not be desirable, as the directing the transducer's output towards the obstruction may distort or otherwise interfere with the output. In such examples, the playback devices may self-correct their output to avoid at least some of the effects of the obstruction.

The playback device may detect obstructions using any suitable technique. For instance, the playback device 702 may include one or more microphones, which it may use to capture its own output. By analyzing this captured output for distortions, the playback device may detect the presence of an obstruction in proximity to (e.g., less than 30 cm from) the audio transducer. In further examples, the playback device may include one or more sensors (e.g., an IR LED infrared or ultrasonic sensor) to more directly detect the distance from the playback device to any obstruction(s) that are proximate to the playback device.

Figure 10A:
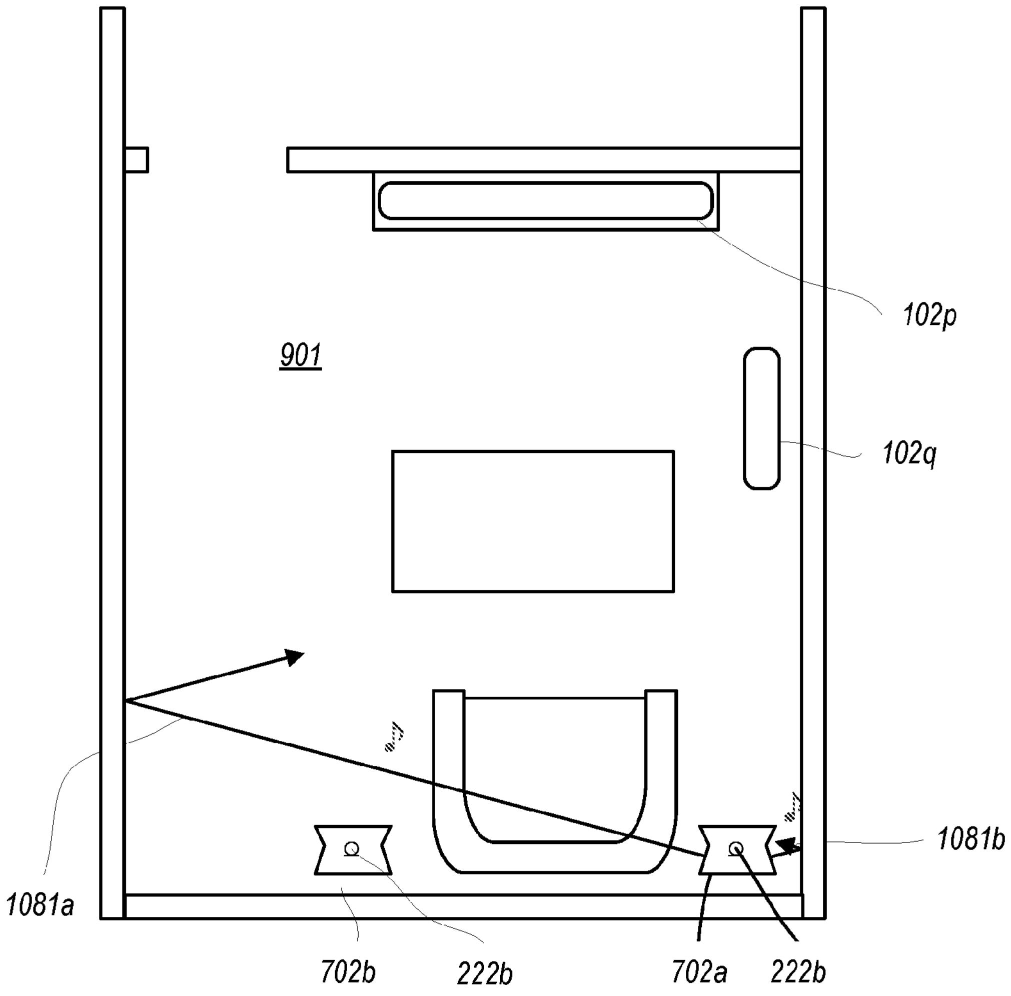
FIGS. 10A and 10B are diagrams illustrating example calibration techniques accordance with aspects of the disclosed technology.

FIG. 10A illustrates a variation of the example zone 901. In contrast to the FIG. 9 example, in FIG. 10A, the first playback device 702*a* is positioned closer to the wall in a corner of the room. The side-firing speaker(s) 718 on the left side (e.g., the side-firing transducer 718*b* and/or the side-firing transducer 718*c*) are directing their output into the room primarily (e.g., with a maximum response lobe) in a first direction indicated by a first arrow 1081*a*. The first direction is approximately 75° from the forward direction.

The side-firing speaker(s) 718 on the right side (e.g., the side-firing transducer 718*e* and/or the side-firing transducer 718*f*) are directing their output primarily in a second direction indicated by a second arrow 1081*b*. As shown, the side-firing speaker(s) 718 on the right side are directing their output into a proximate wall, which typically causes distortion. Like the first direction, the second direction is approximately 75° from the forward direction, albeit on the opposite side.

As further shown in FIG. 10A, the playback device 702*a* includes one or more microphones 722*a*. In this example, the playback device 702*a* is configured to capture its own output via the speakers 718 using the microphone 722*a*. After capturing the output, the playback device 702*a* analyzes the output to detect whether the output is representative of distorted output. Obstructions in close proximity to the playback device 702*a* may cause significant distortions that are identifiable in a frequency response (e.g., a power spectral density). Additional details of obstruction detection are described in, for example, in U.S. Pat. No. 9,264,839, titled "Playback Device Configuration Based on Proximity Detection," which is incorporated by reference herein in its entirety.

Within examples, when an obstruction is detected, the playback device 702*a* is configured to use a steering technique to direct the output away from its "natural" output pattern (e.g., as provided by the physical configuration of the speakers 718 and/or example spatial imaging techniques described herein) and in a direction that is less affected by the obstruction. For instance, the playback device 702*a* may narrow the spatial image and direct its output primarily more towards the forward direction.

Within examples, beam steering with the playback device 702*a* may involve varying the gain on the speakers 718. In particular, amplifying output on the forward-facing transducer 718*a* more relative to the side-firing transducers 718 will cause the directional impulse response to move toward the forward direction. Additional details of beam steering are described in, for example, in U.S. Pat. No. 9,973,851, titled "Multi-Channel Playback of Audio Content," which is incorporated by reference herein in its entirety.

Figure 10B:
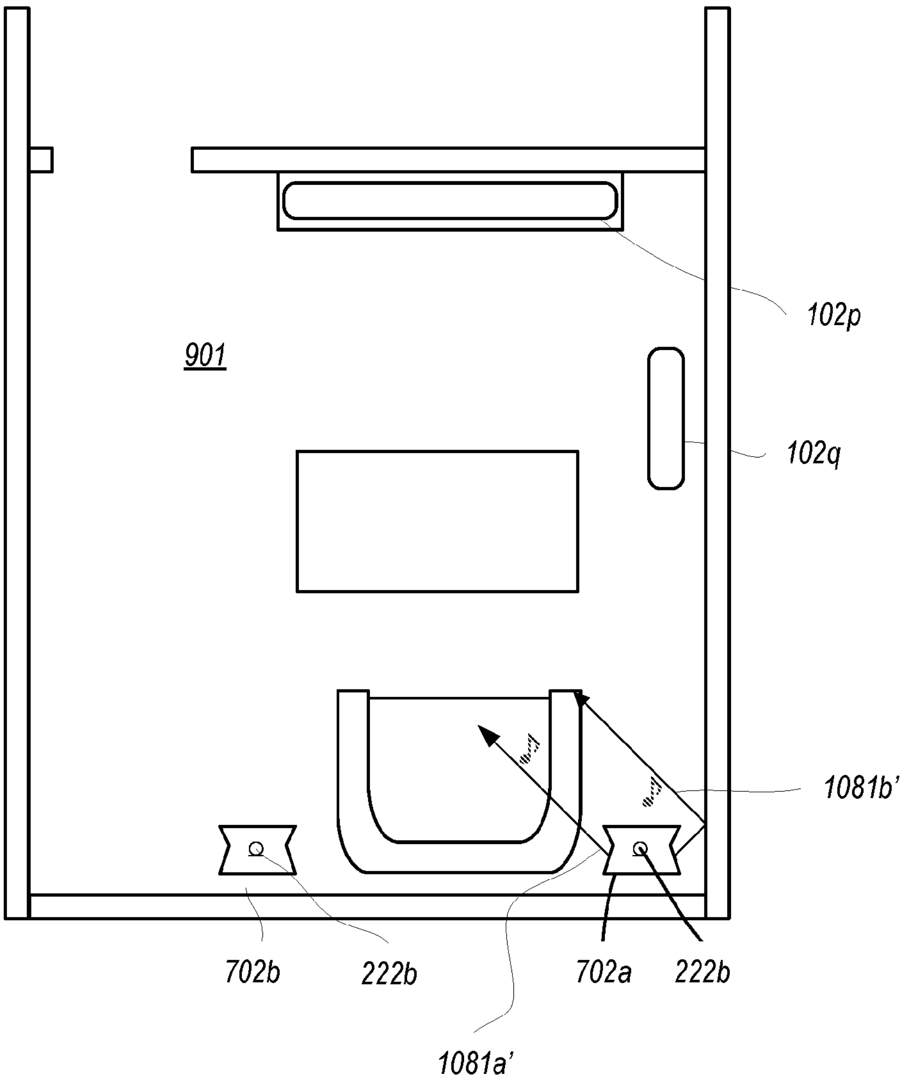

To illustrate, FIG. 10B illustrates the output of the playback device 702*a* after steering its output to avoid or lessen the effect of the proximate wall. As shown, the side-firing speaker(s) 718 on the left side (e.g., the side-firing transducer 718*b* and/or the side-firing transducer 718*c*) are now directing their output into the room primarily in a third direction indicated by a third arrow 1081*a*'. Similarly, the side-firing speaker(s) 718 on the right side (e.g., the side-firing transducer 718*e* and/or the side-firing transducer 718*f*) are directing their output primarily in a fourth direction indicated by a fourth arrow 1081*b*'. The third and fourth directions are approximately 45° from the forward direction on either side. As shown, the side-firing speaker(s) 718 on the right side are now directing their output into a proximate wall at an angle that permits sound to reflect back into the zone 1001 rather than being significantly distorted.

In further examples, the playback device 702*a* is configured to use the microphones 722 for one or more self-calibration procedures. The playback device 702 may perform such calibration procedures independently of or in conjunction with obstruction detection. Such self-calibration procedures may be triggered periodically or when a change in the playback device 702*a* (e.g., a change in position or orientation) or the environment is detected.

In such procedures, the playback device 702*a* captures its own playback using its own microphones and then determines a self-impulse response. The playback device may then identify a pre-determined spectral correction that is mapped to the determined self-impulse response. Such mapping may be based on a machine learning algorithm that has been trained on a large number of manual spectral calibration iterations in different listening areas. Additional details regarding self-calibration can be found, for example, in U.S. Pat. No. 9,763,018, titled "Calibration of Audio Playback Devices," U.S. Pat. No. 10,299,061, titled "Playback Device Calibration," and U.S. Pat. No. 10,734,965, titled "Audio Calibration of a Portable Playback Device," which are each incorporated by reference in their entirety.

V. Example Primary-Ambient Playback Techniques

Figure 11:
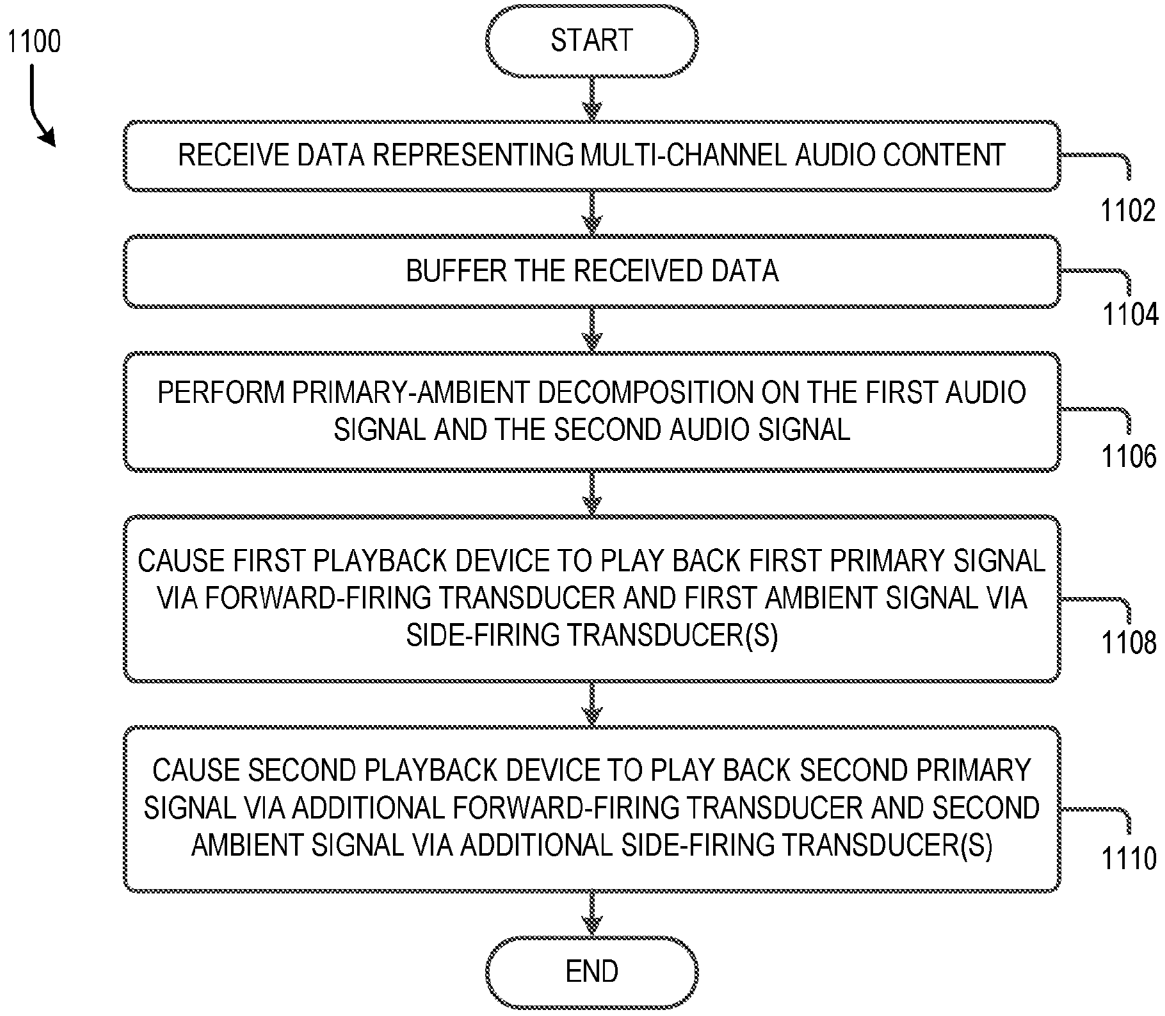
FIG. 11 is a flow diagram of an example method in accordance with aspects of the disclosed technology.

FIG. 11 is a flow diagram showing an example method 1100 to facilitate primar-ambient playback of surround audio. The method 1100 may be performed by a playback device having multiple audio transducers in a suitable arrangement, such as the playback device 702 (FIG. 7A-7D). A suitable arrangement may include a forward-firing transducer, one or more first side-firing transducers, and one or more second side-firing transducers, among other possible examples. In further examples, the method is performed by two or more playback devices operating as a system. Alternatively, the method 1100 may be performed by any suitable device or by a system of devices, such as the NMDs 103, control devices 104, computing devices 105, and/or computing devices 106. For purposes of illustration, the method 1100 is described as being performed by a bonded zone 901 that includes the play back device 102*p*, the first playback device 702*a*, and the second playback device 702*b* (FIG. 9).

At block 1102, the method 1100 includes receiving data representing multi-channel audio content. For instance, the bonded zone 901 may multi-channel stereo audio content including a first audio signal represent a first surround channel (e.g., the first surround channel 861*a* shown in FIG. 8), a second audio signal representing a second surround channel (e.g., the second surround channel 861*b*), and one or more third audio signals (e.g., center, left, and/or right channels). The bonded zone 901 may receive the multi-channel audio content from any of the example audio content sources described in connection with section II. a., as well as other suitable sources of stereo audio content. For example, the bonded zone may receive surround audio content in a surround sound audio format (e.g., Dolby Digital®, Dolby Atmos®, or DTS®, among other examples) via an input interface (e.g., an optical or a high-definition multimedia interface (HDMI).

At block 1104, the method 1100 includes buffering the received data representing the multi-channel audio content. For instance, the bonded zone 901 may buffer the received data into one or more buffers in data storage (e.g., the memory 213 in FIG. 2A) on one or more of the playback device 102*p*, the first playback device 702*a*, and the second playback device 702*b*. In further examples, the bonded zone 901 may buffer the first audio signal, the second audio signal, and the one or more third audio signals into respective buffers. For example, the first playback device 702*a* buffers the first audio signal and the second audio signal, the second play back device 702*b* buffers the first audio signal and the second audio signal, and the playback device 102*m* buffer the one or more third audio signals. Other arrangements are possible as well.

At block 1106, the method 1100 includes performing primary-ambient decomposition on the first audio signal and the second audio signal. The primary-ambient decomposition may generate a first primary signal and at least one first ambient signal. For instance, the playback device 702*a* may perform a primary-ambient decomposition on the first surround channel 861*a* and the second surround channel 861*b* to generate the direct sound signal 863 and the ambient sound signals 865.

The primary-ambient decomposition may also generate a second primary signal and at least one second ambient signal. For example, the playback device 702*b* may perform an additional primary-ambient decomposition on the first surround channel 861*a* and the second surround channel 861*b* to generate an additional direct sound signal and additional ambient sound signals. In some examples, the first primary signal and the second primary signal are the same (e.g., generated from one primary-ambient decomposition).

In some examples, to generate respective primary and ambient signals for the first playback device 702*a* and the second playback device 702*b*, the surround channels are switched as inputs. For instance, the playback device 702*a* may receive a right surround channel (e.g., the first surround channel 861*a*) and a left surround channel (e.g., the second surround channel 861*b*) and perform a primary-ambient decomposition with the right surround channel as the first input. Then, conversely, the playback device 702*b* may receive the right surround channel (e.g., the first surround channel 861*a*) and the left surround channel (e.g., the second surround channel 861*b*) and perform a primary-ambient decomposition with the left surround channel as the first input. Such primary-ambient decomposition generate respective first and second primary signals and first and second ambient signal(s) for the first playback device 702*a* and the second playback device 702*b*.

Within examples, performing primary-ambient decomposition may involve determining first signals representing the first audio signal in respective frequency bands in the short time Fourier transform (STFT) domain and determining second signals representing the second audio signal in respective frequency bands in the STFT domain. For instance, the bonded zone 801 may use the FFT 870 (FIG. 8) to transform the surround channels 861 to first and second signals in the STFT domain. Further, each first signal may include a respective series of first segments representing the first audio signal in respective time periods. Similarly, each second signal comprises a respective series of second segments representing the second audio signal in the respective time periods.

In some examples, performing primary-ambient decomposition may involve transient detection. For instance, the bonded zone 901 may perform transient detection with the transient detector 878 (FIG. 8). When a transient is detected, the method 1100 may involve adapting decomposition of the first signals to decompose one or more particular first segments including the transient to the first primary signal (e.g., by restarting adaptation).

At block 1108, the method 1100 includes causing the first playback device to play back the first primary signal via the first forward-firing audio transducer and the first ambient signal via the side-firing audio transducers. For instance, the first playback device 702*a* may play back the direct sound signal 863 via its respective forward-firing transducer 718*a* and the ambient sound signals 865 with its respective side-firing transducers 718*b*, 718*c*, 718*e*, and/or 718*f*. The first playback device may playback the first primary signal and the second ambient signal in synchrony with playback of the one or more third audio signals by a third playback device (e.g., the playback device 102*p*).

As noted above, within examples, the multi-channel audio content may be mixed according to one or more surround sound formats, such as (e.g., Dolby Digital®, Dolby Atmos®, or DTS®, among other examples). Some surround sound formats, such as Dolby Atmos® includes an object-based mix comprising objects represented by metadata. In such examples, causing the first playback device to play back the first primary signal via the front-firing audio transducer may include playing back a portion of the first primary signal via the front-firing audio transducer and at least one of the side-firing audio transducers to represent one or more objects according to the metadata.

Further, such formats may further include height channels. The playback device 702 may use an upward-firing transducer (e.g., the transducer 718*d*) to play back a height channel. For instance, the first playback device 702*a* and the second playback device 702*b* may play back respective height channels of multi-channel audio use respective upward-firing transducers.

At block 1010, the method 1000 includes causing the second playback device to play back the second primary signal via an additional forward-firing audio transducer and the second ambient signal via the additional side-firing audio transducers. For instance, the second playback device 702*b* may play back the direct sound signal 863 via its respective forward-firing transducer 718*a* and the ambient sound signals 865 with its respective side-firing transducers 718*b*, 718*c*, 718*e*, and/or 718*f*. The first playback device may playback the first primary signal and the second ambient signal in synchrony with playback of the one or more third audio signals by a third playback device (e.g., the playback device 102*p*).

In some examples, the method 1100 may further include detecting an obstruction within a minimum proximity to the first side-firing audio transducer. For example, as discussed in connection with FIG. 10A, the playback device 702*a* may detect a wall within a minimum proximity to the playback device 702*a*. The playback device 702*a* may detect obstructions using any suitable technique, such as the example techniques discussed in connection with FIG. 10A.

The method 1100 may then involve performing a self-correction, which may involve adjusting a mix between the first side-firing audio transducer and the forward-firing transducer to steer combined output of the first side-firing audio transducer and the forward-firing transducer away from the obstruction. For instance, as discussed in connection with FIG. 10B, the playback device 702*a* may steer its output toward the forward direction, which may reduce or eliminate distortion from the proximate wall. The playback device 702*a* may self-correct using any suitable technique, such as the example techniques discussed in connection with FIG. 10B.

In further examples, the method 1100 may include detection multiple obstructions. For instance, the playback device 702*a* may detect obstructions within a minimum proximity to a first side-firing audio transducer (e.g., the transducer 718*c*) and a second side-firing audio transducer (e.g., the transducer 718*e*). In such examples, the playback device 702*a* may likewise perform a self-correction, which may be, for example, adjusting a mix between the side-firing audio transducers and the forward-firing transducer to output at least a portion of the ambient signal(s) via the forward-firing transducer.

VI. Example Mode Switching

Within examples, the playback device 702 (FIGS. 7A-7D) is configured to operate in one of multiple modes. The playback device 702 may switch between the multiple modes when different types of audio content are selected for playback. The different types of content may correspond to audio content with different numbers of channels (e.g., stereo vs. surround), and/or different content itself (e.g., music vs. television sound). Different types of content may be enhanced in different ways, such as using the example spatial imaging techniques disclosed herein with stereo audio content or using other processing techniques with other types of content.

In some implementations, the modes are mutually exclusive in that the playback device 702 operates in only one of the multiple modes at a time. In further examples, two or more modes may be active concurrently with the two active modes being a subset of multiple modes supported by the playback device 702. In yet further examples, an example mode may include two or more sound processing techniques, which may be individually utilized in other modes.

For example, the playback device may be configured to enter a first mode while rending stereo audio content. In the first mode, the playback device 702 may utilize a spatial imaging technique. Operation in the first mode with the example spatial imaging techniques active may produce a wider stereo image as compared with a "natural" response of the playback device 702.

Further, the playback device 702 may be configured to enter a second mode while rendering surround audio content. In the second mode, the playback device 702 may utilize example primary-ambient decomposition techniques (FIG. 11). Operation in the second mode with the example primary-ambient decomposition techniques active may produce less direction ambient content while maintaining directionality of primary audio content in the mix.

The play back device 702 may be configured to switch modes based on various triggers. For instance, the playback device 702 may switch to the first mode when configured as an individual playback device or stereo pair (FIG. 3B) and switch to the second mode when configured as a surround in a home theatre configuration (FIGS. 3C-3D). In other examples, the playback device 702 may switch between modes when a different input is selected, such as an HDMI input (which may cause, for instance, a switch to the second mode). In further examples, the playback device 702 may switch between modes when different content is received (e.g., surround channels of multi-channel audio content) or stereo audio content. Further examples are possible as well.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method involving a first playback device, a second playback device, an a third playback device, the method comprising: receiving data representing multi-channel audio content, the multi-channel audio content comprising a first audio signal representing a first surround channel, a second audio signal representing a second surround channel, and one or more third audio signals; buffering the received data representing the multi-channel audio content into one or more buffers; as the received multi-channel audio content is buffered, performing primary-ambient decomposition on the first audio signal and the second audio signal to generate (i) a first primary signal and a first ambient signal and (ii) a second primary signal and a second ambient signal; causing the first playback device to play back the first primary signal via the first forward-firing audio transducer and the first ambient signal via the side-firing audio transducers in synchrony with playback of the one or more third audio signals by the third playback device; and causing the second playback device to play back the second primary signal via the additional forward-firing audio transducer and the second ambient signal via the additional side-firing audio transducers in synchrony with playback of the one or more third audio signals by the third playback device.

Example 2: The method of Example 1, wherein the side-firing audio transducers of the first playback device comprise a first side-firing audio transducer and a second side-firing audio transducer, and wherein the first playback device comprises a housing carrying the first side-firing audio transducer, the second side-firing audio transducer, and the front-firing audio transducer such that the first side-firing audio transducer is directed in a first direction, the second side-firing audio transducer is directed in a second direction that is opposite the first direction, and the front-firing audio transducer is directed in a third direction that is orthogonal to the first direction and the second direction.

Example 3: The method of Example 2, wherein causing the first playback device to play back the first primary audio signal via the front-firing audio transducer comprises playing back a portion of the first primary signal via the front-firing audio transducer and at least one of the side-firing audio transducers such that a beam is formed that having a primary lobe in a direction between the first direction and the second direction.

Example 4: The method of Example 2, further comprising: detecting an obstruction within a minimum proximity to the first side-firing audio transducer; and adjusting a mix between the first side-firing audio transducer and the second side-firing audio transducer to output more of the first ambient signal via the first side-firing audio transducer.

Example 5: The method of Example 2, further comprising: detecting obstructions within a minimum proximity to the first side-firing audio transducer and the second side-firing audio transducer; and adjusting a mix between the side-firing audio transducers and the forward-firing transducer to output at least a portion of the first ambient signal via the forward-firing transducer.

Example 6: The method of any of Examples 1-5, wherein the multi-channel audio content includes an object-based mix comprising objects represented by metadata, and wherein causing the first playback device to play back the first primary signal via the front-firing audio transducer comprises playing back a portion of the first primary signal via the front-firing audio transducer and at least one of the side-firing audio transducers to represent one or more objects according to the metadata.

Example 7: The method of any of Examples 1-6, wherein performing the primary-ambient decomposition on the first audio signal and the second audio signal comprises: determining first signals representing the first audio signal in respective frequency bands in the short time Fourier transform (STFT) domain, wherein each first signal comprises a respective series of first segments representing the first audio signal in respective time periods; determining second signals representing the second audio signal in respective frequency bands in the STFT domain, wherein each second signal comprises a respective series of second segments representing the second audio signal in the respective time periods; and performing the primary-ambient decomposition on the first signals and the second signals.

Example 8: The method of Example 7, wherein the primary-ambient decomposition adapts decomposition of the first signals and the seconds signals over multiple first segments and second segments, and wherein performing the primary-ambient decomposition on the first signals and the second signals comprises: during playback of the first ambient signal, analyzing the first segments with a transient detector; and when the transient detector detects a transient in the first segments, adapting decomposition of the first signals to decompose one or more particular first segments including the transient to the first primary signal.

Example 9: The method of any of Examples 1-8: wherein the third playback device comprises a high-definition multimedia interface, and wherein the third playback device comprises the at least one processor and the data storage, and wherein receiving the multi-channel audio content comprises receiving the multi-channel audio content via the high-definition multimedia interface, and wherein the method further comprises: causing the third playback device to play back the one or more third audio signals.

Example 10: The method of any of Examples 1-9, further comprising: buffering the received data representing the multi-channel audio content into one or more buffers, and wherein performing the primary-ambient decomposition comprises: as the received multi-channel audio content is buffered, performing the primary-ambient decomposition.

Example 11: The method of Examples 1-10, wherein the first playback device comprises the network interface, at least one processor and the data storage, and wherein receiving the multi-channel audio content comprises receiving the multi-channel audio content via the network interface.

Example 12: A tangible, non-transitory, computer-readable medium having instructions stored thereon that are executable by one or more processors to cause a playback device to perform the method of any one of Examples 1-11.

Example 13: A media playback system comprising a playback device, the media playback system configured to perform the method of any one of Examples 1-11.

Example 14: A bonded zone comprising a first playback device, a second playback device, and a third playback device, the bonded zone configured to perform the method of any one of Examples 1-11.

Example 15: A playback device comprising at least one speaker, a network interface, a microphone, one or more processors, and a data storage having instructions stored thereon that are executable by the one or more processors to cause the playback device to perform the method of any of Examples 1-11.

I claim:

1. A system comprising:

a first playback device including a forward-firing audio transducer and side-firing audio transducers;

a second playback device including an additional forward-firing audio transducer and additional side-firing audio transducers;

a third playback device;

a network interface;

at least one processor; and data storage including instructions that are executable by the at least one processor such that the system is configured to perform functions comprising:

receiving data representing multi-channel audio content, the multi-channel audio content comprising a first audio signal representing a first surround channel, a second audio signal representing a second surround channel, and one or more third audio signals;

performing primary-ambient decomposition on the first audio signal and the second audio signal to generate (i) a first primary signal and a first ambient signal and (ii) a second primary signal and a second ambient signal, wherein performing the primary-ambient decomposition on the first audio signal and the second audio signal comprises:

determining first signals representing the first audio signal in respective frequency bands in the short time Fourier transform (STFT) domain, wherein each first signal comprises a respective series of first segments representing the first audio signal in respective time periods;

determining second signals representing the second audio signal in respective frequency bands in the STFT domain, wherein each second signal comprises a respective series of second segments representing the second audio signal in the respective time periods; and performing the primary-ambient decomposition on the first signals and the second signals;

causing the first playback device to play back the first primary signal via first forward-firing audio transducer and the first ambient signal via the side-firing audio transducers in synchrony with playback of the one or more third audio signals by the third playback device; and causing the second playback device to play back the second primary signal via the additional forward-firing audio transducer and the second ambient signal via the additional side-firing audio transducers in synchrony with playback of the one or more third audio signals by the third playback device.

2. The system of claim 1, wherein the side-firing audio transducers of the first playback device comprise a first side-firing audio transducer and a second side-firing audio transducer, and wherein the first playback device comprises a housing carrying the first side-firing audio transducer, the second side-firing audio transducer, and the forward-firing audio transducer such that the first side-firing audio transducer is directed in a first direction, the second side-firing audio transducer is directed in a second direction that is opposite the first direction, and the forward-firing audio transducer is directed in a third direction that is orthogonal to the first direction and the second direction.

3. The system of claim 2, wherein causing the first playback device to play back the first primary signal via the forward-firing audio transducer comprises:

playing back a portion of the first primary signal via the forward-firing audio transducer and at least one of the side-firing audio transducers such that a beam is formed that having a primary lobe in a direction between the first direction and the second direction.

4. The system of claim 2, wherein the functions further comprise:

detecting an obstruction within a minimum proximity to the first side-firing audio transducer; and adjusting a mix between the first side-firing audio transducer and the second side-firing audio transducer to output more of the first ambient signal via the first side-firing audio transducer.

5. The system of claim 2, wherein the functions further comprise:

detecting obstructions within a minimum proximity to the first side-firing audio transducer and the second side-firing audio transducer; and adjusting a mix between the side-firing audio transducers and the forward-firing audio transducer to output at least a portion of the first ambient signal via the forward-firing audio transducer.

6. The system of claim 1, wherein the multi-channel audio content includes an object-based mix comprising objects represented by metadata, and wherein causing the first playback device to play back the first primary signal via the forward-firing audio transducer comprises:

playing back a portion of the first primary signal via the forward-firing audio transducer and at least one of the side-firing audio transducers to represent one or more objects according to the metadata.

7. The system of claim 1, wherein the primary-ambient decomposition adapts decomposition of the first signals and the seconds signals over multiple first segments and second segments, and wherein performing the primary-ambient decomposition on the first signals and the second signals comprises:

during playback of the first ambient signal, analyzing the first segments with a transient detector; and when the transient detector detects a transient in the first segments, adapting decomposition of the first signals to decompose one or more particular first segments including the transient to the first primary signal.

8. The system of claim 1, wherein the third playback device comprises a high-definition multimedia interface, and wherein the third playback device comprises the at least one processor and the data storage, and wherein receiving the multi-channel audio content comprises receiving the multi-channel audio content via the high-definition multimedia interface, and wherein the functions further comprise:

causing the third playback device to play back the one or more third audio signals.

9. The system of claim 1, wherein the first playback device comprises the network interface, the at least one processor and the data storage, and wherein receiving the multi-channel audio content comprises receiving the multi-channel audio content via the network interface.

10. The system of claim 1, wherein the functions further comprise:

buffering the received data representing the multi-channel audio content into one or more buffers, and wherein performing the primary-ambient decomposition comprises:

as the received multi-channel audio content is buffered, performing the primary-ambient decomposition.

11. A first playback device comprising:

a forward-firing audio transducer and side-firing audio transducers;

a network interface;

at least one processor; and data storage including instructions that are executable by the at least one processor such that the first playback device is configured to perform functions comprising, receiving data representing multi-channel audio content, the multi-channel audio content comprising a first audio signal representing a first surround channel a second audio signal representing a second surround channel;

performing primary-ambient decomposition on the first audio signal and the second audio signal to generate primary signal and a first ambient signal and (ii) a second primary signal and a second ambient signal, wherein performing the primary-ambient decomposition on the first audio signal and the second audio signal comprises:

determining first signals representing the first audio signal in respective frequency bands in the short time Fourier transform (STFT) domain, wherein each first signal comprises a respective series of first segments representing the first audio signal in respective time periods;

determining second signals representing the second audio signal in respective frequency bands in the STFT domain, wherein each second signal comprises a respective series of second segments representing the second audio signal in the respective time periods; and performing the primary-ambient decomposition on the first signals and the second signals;

causing a second playback device to play back the second primary signal via an additional forward-firing audio transducer and the second ambient signal via an additional side-firing audio transducers in synchrony with playback of one or more third audio signals by a third playback device; and playing back the first primary signal via the forward-firing audio transducer and the first ambient signal via the side-firing audio transducers in synchrony with playback of the one or more third audio signals by the third playback device.

12. The first playback device of claim 11, wherein the side-firing audio transducers of the first playback device comprise a first side-firing audio transducer and a second side-firing audio transducer, and wherein the first playback device comprises a housing carrying the first side-firing audio transducer, the second side-firing audio transducer, and the forward-firing audio transducer such that the first side-firing audio transducer is directed in a first direction, the second side-firing audio transducer is directed in a second direction that is opposite the first direction, and the forward-firing audio transducer is directed in a third direction that is orthogonal to the first direction and the second direction.

13. The first playback device of claim 12, wherein playing back the first primary signal via the forward-firing audio transducer comprises:

playing back a portion of the first primary signal via the forward-firing audio transducer and at least one of the side-firing audio transducers such that a beam is formed that having a primary lobe in a direction between the first direction and the second direction.

14. The first playback device of claim 12, wherein the functions further comprise:

detecting an obstruction within a minimum proximity to the first side-firing audio transducer; and adjusting a mix between the first side-firing audio transducer and the second side-firing audio transducer to output more of the first ambient signal via the first side-firing audio transducer.

15. The first playback device of claim 12, wherein the functions further comprise:

detecting obstructions within a minimum proximity to the first side-firing audio transducer and the second side-firing audio transducer; and adjusting a mix between the side-firing audio transducers and the forward-firing audio transducer to output at least a portion of the first ambient signal via the forward-firing audio transducer.

16. The first playback device of claim 11, wherein the multi-channel audio content includes an object-based mix comprising objects represented by metadata, and wherein causing the first playback device to play back the first primary signal via the forward-firing audio transducer comprises:

playing back a portion of the first primary signal via the forward-firing audio transducer and at least one of the side-firing audio transducers to represent one or more objects according to the metadata.

17. The first playback device of claim 11, wherein the primary-ambient decomposition adapts decomposition of the first signals and the seconds signals over multiple first segments and second segments, and wherein performing the primary-ambient decomposition on the first signals and the second signals comprises:

during playback of the first ambient signal, analyzing the first segments with a transient detector; and when the transient detector detects a transient in the first segments, adapting decomposition of the first signals to decompose one or more particular first segments including the transient to the first primary signal.

18. The first playback device of claim 11, wherein the first playback device comprises the network interface, the at least one processor and the data storage, and wherein receiving the multi-channel audio content comprises receiving the multi-channel audio content via the network interface.

19. The first playback device of claim 11, wherein the functions further comprise:

buffering the received data representing the multi-channel audio content into one or more buffers, and wherein performing the primary-ambient decomposition comprises:

as the received multi-channel audio content is buffered, performing the primary-ambient decomposition.

20. A method comprising:

receiving data representing multi-channel audio content, the multi-channel audio content comprising a first audio signal representing a first surround channel, a second audio signal representing a second surround channel, and one or more third audio signals;

buffering the received data representing the multi-channel audio content into one or more buffers;

as the received multi-channel audio content is buffered, performing primary-ambient decomposition on the first audio signal and the second audio signal to generate (i) a first primary signal and a first ambient signal and (ii) a second primary signal and a second ambient signal, wherein performing the primary-ambient decomposition on the first audio signal and the second audio signal comprises:

determining first signals representing the first audio signal in respective frequency bands in the short time Fourier transform (STFT) domain, wherein each first signal comprises a respective series of first segments representing the first audio signal in respective time periods;

determining second signals representing the second audio signal in respective frequency bands in the STFT domain, wherein each second signal comprises a respective series of second segments representing the second audio signal in the respective time periods; and performing the primary-ambient decomposition on the first signals and the second signals:

causing a first playback device to play back the first primary signal via a first forward-firing audio transducer and the first ambient signal via-side-firing audio transducers in synchrony with playback of the one or more third audio signals by a second playback device; and causing a third playback device to play back the second primary signal via an additional forward-firing audio transducer and the second ambient signal via additional side-firing audio transducers in synchrony with playback of the one or more third audio signals by the second playback device.

* * * * *